US012617077B2

(12) United States Patent
Takagi

(10) Patent No.: US 12,617,077 B2
(45) Date of Patent: May 5, 2026

(54) CONTINUUM ROBOT CONTROL SYSTEM AND CONTINUUM ROBOT CONTROL METHOD

(71) Applicant: CANON KABUSHIKI KAISHA, Tokyo (JP)

(72) Inventor: Kiyoshi Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 18/801,079

(22) Filed: Aug. 12, 2024

(65) Prior Publication Data

US 2024/0399563 A1 Dec. 5, 2024

Related U.S. Application Data

(63) Continuation of application No. PCT/JP2023/001645, filed on Jan. 20, 2023.

(30) Foreign Application Priority Data

Feb. 14, 2022 (JP) ................................. 2022-020491

(51) Int. Cl.
B25J 9/06 (2006.01)
B25J 9/10 (2006.01)
(Continued)

(52) U.S. Cl.
CPC ............... B25J 9/065 (2013.01); B25J 9/104 (2013.01); B25J 9/123 (2013.01); B25J 9/1664 (2013.01)

(58) Field of Classification Search
CPC . A61B 1/0016; A61B 1/0057; A61B 1/00006; A61B 34/71; A61B 34/30;
(Continued)

(56) References Cited

U.S. PATENT DOCUMENTS

| 11,103,992 | B2 | 8/2021 | Tanaka et al. | |
| 2002/0120252 | A1* | 8/2002 | Brock .................... | A61B 90/36 |
| | | | | 606/1 |

(Continued)

FOREIGN PATENT DOCUMENTS

| JP | 2018008335 A | 1/2018 |
| JP | 2019202137 A | 11/2019 |

(Continued)

OTHER PUBLICATIONS

International Search Report and Written Opinion for PCT/JP2023/001645, mailed Apr. 4, 2023, originally published in Japanese, and an English translation of International Search Report and Machine Translation into English of Written Opinion obtained from WIPO using WIPO Translate are included herewith.

*Primary Examiner* — Stephen Holwerda

(74) *Attorney, Agent, or Firm* — CANON U.S.A., INC. IP DIVISION

(57) ABSTRACT

A control unit that controls the motion of a continuum robot including a bendable unit having a plurality of bending sections, defines a predetermined position on a wire guide located most distal from a base in the second bending section, which is a follower bending section, as an origin, sets reference axes for a direction in which the wire guide is facing, and causes a drive unit in the base to drive a wire of the third bending section so that the third bending section, which is a distal bending section, is bent on the basis of a relative coordinate system in which the origin and the reference axes relating to the wire guide vary in accordance with the movement of the continuum robot.

19 Claims, 20 Drawing Sheets

(51) Int. Cl.
    *B25J 9/12*         (2006.01)
    *B25J 9/16*         (2006.01)

(58) Field of Classification Search
    CPC ......... A61B 2034/306; A61B 2034/301; B25J
                9/06; B25J 9/123; B25J 9/065; B25J
                       9/1664; B25J 9/104
    See application file for complete search history.

(56)               References Cited

U.S. PATENT DOCUMENTS

| | | | |
|---|---|---|---|
| 2015/0088161 A1 | 3/2015 | Hata et al. | |
| 2017/0367777 A1* | 12/2017 | Kralicky ................ | A61B 34/37 |
| 2018/0153621 A1* | 6/2018 | Duindam ................ | G06T 19/20 |
| 2018/0304458 A1 | 10/2018 | Takagi | |
| 2021/0060800 A1* | 3/2021 | Takagi ................... | G02B 23/24 |
| 2021/0121051 A1 | 4/2021 | Altshuler et al. | |
| 2022/0032456 A1 | 2/2022 | Kose | |

FOREIGN PATENT DOCUMENTS

| | | |
|---|---|---|
| JP | 2019532824 A | 11/2019 |
| JP | 2022002693 A | 1/2022 |
| WO | 2018037931 A1 | 3/2018 |
| WO | 2021261419 A1 | 12/2021 |

* cited by examiner 10-2

CONTINUUM ROBOT CONTROL SYSTEM AND CONTINUUM ROBOT CONTROL METHOD

CROSS-REFERENCE TO RELATED APPLICATIONS

This application is a Continuation of International Patent Application No. PCT/JP2023/001645, filed Jan. 20, 2023, which claims the benefit of Japanese Patent Application No. 2022-020491, filed Feb. 14, 2022, both of which are hereby incorporated by reference herein in their entireties.

TECHNICAL FIELD

The present disclosure relates to a continuum robot control system and a continuum robot control method for controlling the motion of a continuum robot.

BACKGROUND ART

A continuum robot has a bendable unit including a plurality of bending sections with a flexible structure. The shape of the continuum robot is controlled by deforming the bending sections. A continuum robot has mainly two advantages over a robot configured with rigid links. The first advantage is that the continuum robot can move along a curve in a narrow space or in an environment with scattered objects in which the rigid-link robot may get stuck. The second advantage is that since the continuum robot has intrinsic softness, the continuum robot can be operated without damaging a fragile object.

Continuum robots do not necessarily have to detect an external force, which is required for rigid-link robots. Taking advantage of this feature, continuum robots are expected to be applied to the field of healthcare, such as an endoscope sheath and a catheter, and to extreme work robots, such as rescue robots.

PTL 1 describes a control method for controlling a bendable unit of a continuum robot used as an endoscope when the bendable unit enters a narrow space. More specifically, in PTL 1, for all pairs of neighboring bending sections in the bendable unit, control (leader following control) is performed so that the bending shape of a following bending section follows the bending shape of the leading bending section as a base of an endoscope moves forward and, thus, the shape of the endoscope is continuously propagated. In this case, according to PTL 1, the bending angle of the most distal (forward) bending section is continuously propagated to the following bending section over a virtual section length smaller than the actual bending section length. Thus, a command is sent so that the bending angle of the following bending section gets closer to the bending angle of the leading bending section. As a result, contact with a surrounding obstacle is less likely to occur in a narrow space and, therefore, entry into a narrow space path is facilitated.

CITATION LIST

Patent Literature

PTL 1 U.S. Pat. No. 11,103,992

In PTL 1, in the above-mentioned leader following control, a coordinate system is established on a slide stage that has a continuum robot fixed thereon and that moves forward and backward, and the bending angles of all bending sections are determined based on the coordinate system. The technique described in PTL 1 facilitates the operation performed by the operator, because when the operator can look down on the continuum robot, they can grasp the correspondence between the coordinate system for the operation of a bendable unit having a plurality of bending sections and the coordinate system for the front end of the continuum robot. In addition, the amount of calculation in a control system is reduced. However, according to the technique described in PTL 1, for example, when a camera is mounted at the most distal end of the continuum robot, and then, the operator who cannot look down on the continuum robot operates the bendable unit while observing a camera image, it is difficult for the operator to intuitively operate the bendable unit because it is difficult to grasp the bending conditions of the following bending section.

SUMMARY OF INVENTION

Accordingly, it is at least one object of the present disclosure to provide a mechanism that enables the operator to intuitively operate the bendable unit of the continuum robot.

According to at least one aspect of the present disclosure, a continuum robot control system includes a continuum robot including a bendable unit having a plurality of bending sections each configured to be bent by a linear member that is driven, a base configured to support the bendable unit, and a drive unit configured to drive the linear member, where the plurality of bending sections of the bendable unit include a distal bending section that is located distal from the base and that includes a distal fixed member located most distal from the base in the distal bending section and a distal linear member serving as the linear member fixed to the distal fixed member and driven by the drive unit and a follower bending section that is located between the distal bending section and the base and that includes a follower fixed member located most distal from the base in the follower bending section and a follower linear member serving as the linear member fixed to the follower fixed member and driven by the drive unit, and a control unit configured to control the motion of the continuum robot. The control unit defines a predetermined position on the follower fixed member as an origin, sets reference axes for a direction in which the follower fixed member is facing, and causes the drive unit to drive the distal linear member so that the distal bending section is bent based on a relative coordinate system in which the origin and the reference axes relating to the follower fixed member vary in accordance with the movement of the continuum robot.

Furthermore, the present disclosure includes a continuum robot control method for use of the continuum robot control system described above.

Further features of the present disclosure will become apparent from the following description of exemplary embodiments with reference to the attached drawings.

BRIEF DESCRIPTION OF DRAWINGS

Figure 13:
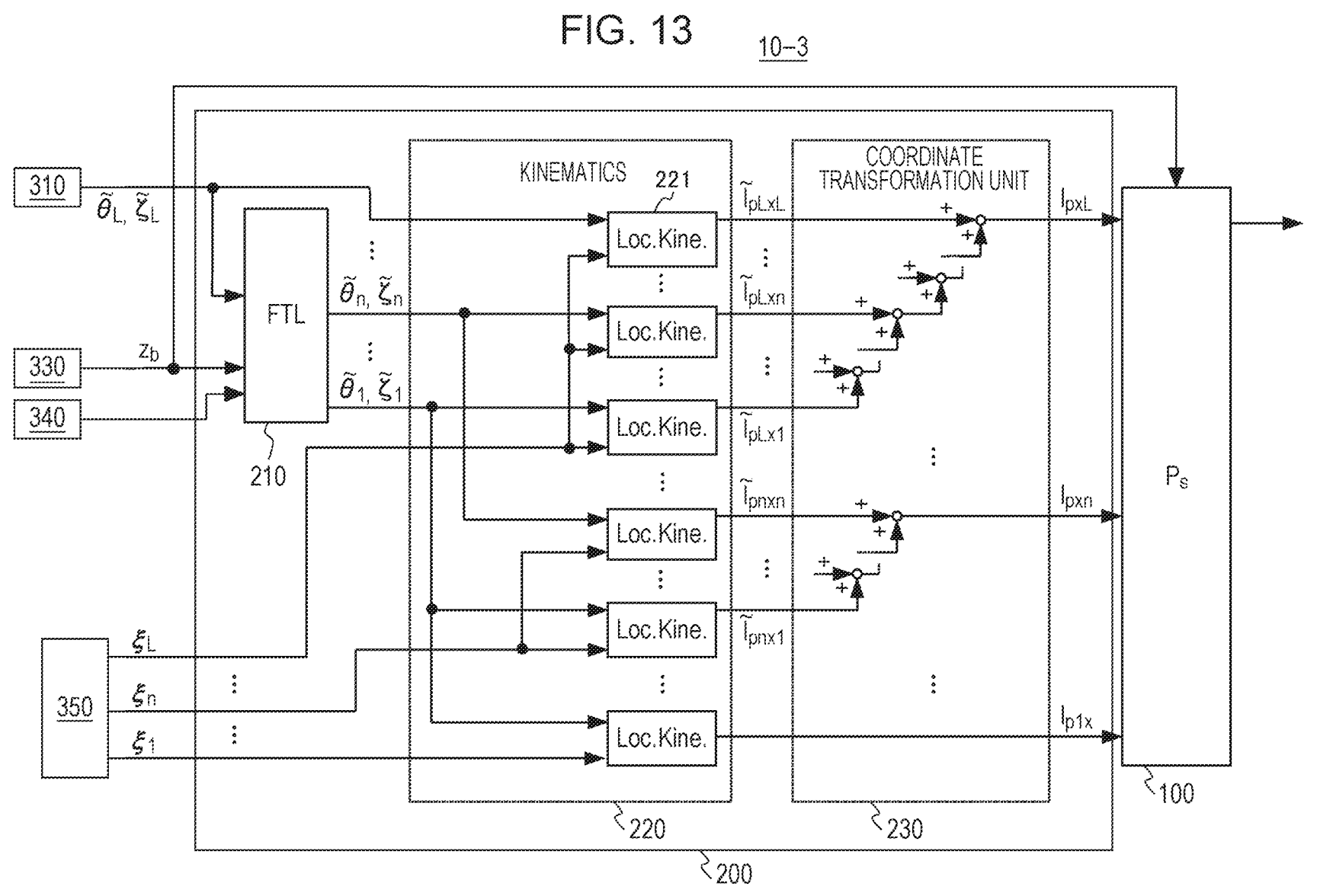

FIG. 13 illustrates an example of a schematic configuration of a continuum robot control system according to a third embodiment of the present disclosure.

DESCRIPTION OF EMBODIMENTS

Embodiments of the present disclosure are described below with reference to the accompanying drawings.

First Embodiment

The first embodiment of the present disclosure is first described.

Figure 1:
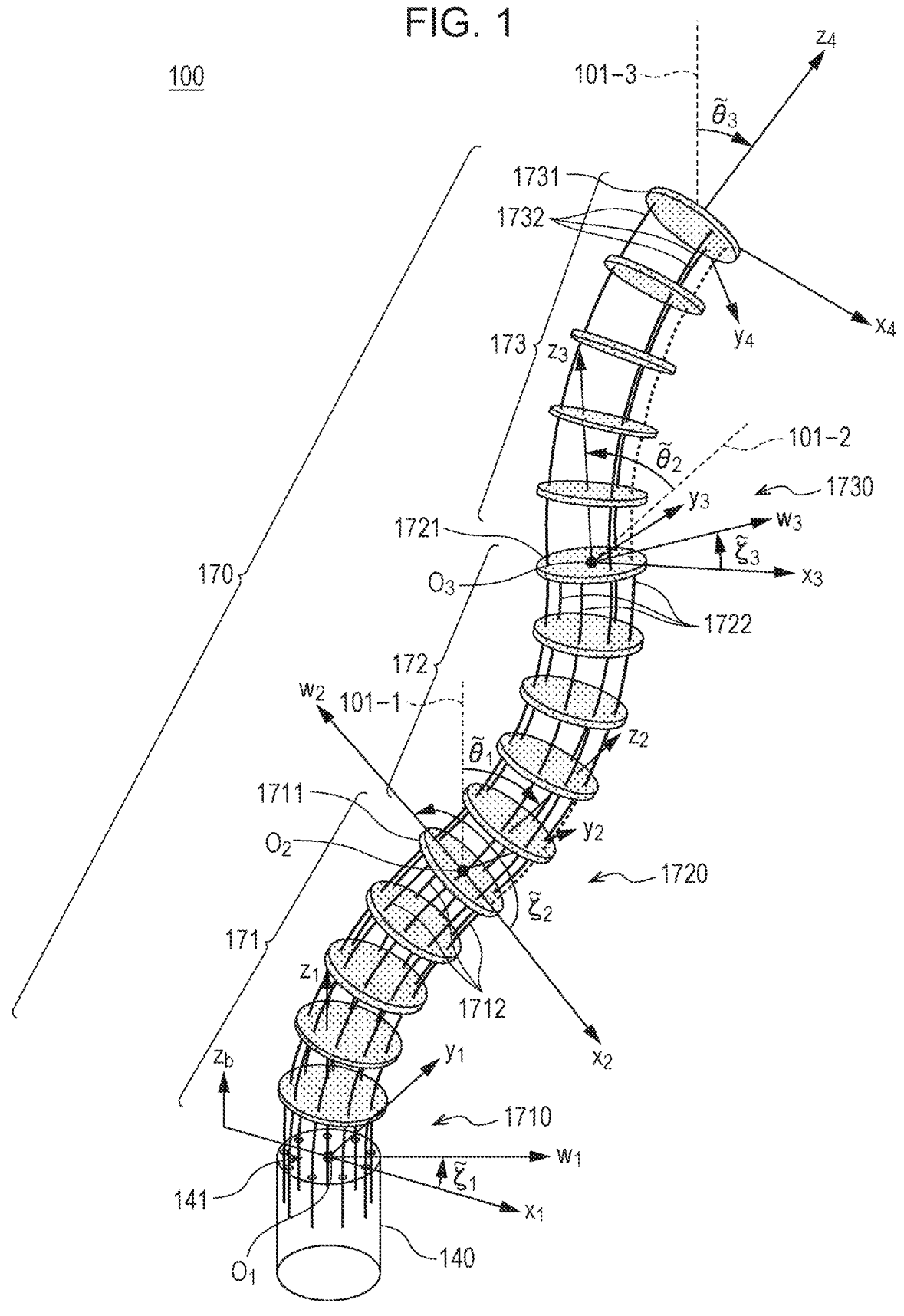
FIG. 1 illustrates an example of a schematic configuration of a continuum robot according to a first embodiment of the present disclosure.

FIG. 1 illustrates an example of a schematic configuration of a continuum robot 100 according to the first embodiment of the present disclosure. FIG. 1 illustrates a base 140 and a bendable unit 170 as one configuration of the continuum robot 100.

The base 140 is a component part that supports the bendable unit 170. The bendable unit 170 is a component part including a plurality of bending sections that bend when a wire, which is a linear member, is driven. More specifically, in an example illustrated in FIG. 1, the bendable unit 170 includes, as the plurality of bending sections, three bending sections, that is, a first bending section 171, a second bending section 172, and a third bending section 173, provided from the side adjacent to the base 140.

The third bending section 173 is a "distal bending section" located distal from the base 140 (more precisely, the "most distal bending section" located most distal from the base 140) among the plurality of bending sections 171 to 173 provided in the bendable unit 170. The third bending section 173 is the lead bending section when the continuum robot 100 moves forward. As illustrated in FIG. 1, the third bending section 173 includes a wire guide 1731, which is a fixed member (a distal fixed member) located most distal from the base 140 in the third bending section 173, and wires 1732, which are linear members (distal linear members) fixed to the wire guide 1731 and driven by actuators, which are drive units housed inside of the base 140. In the example illustrated in FIG. 1, the wires 1732 include three wires, and three actuators each corresponding to one of the three wires are housed inside the base 140.

The second bending section 172 and the first bending section 171 are located between the third bending section 173 and the base 140 and are "follower bending sections" following the third bending section 173, which is the most distal bending section, when the continuum robot 100 moves forward. According to the present embodiment, the second bending section 172 serves as a "first follower bending section", and the first bending section 171 serves as a "second follower bending section".

The second bending section 172 is a bending section located between the third bending section 173, which is the distal bending section (the most distal bending section), and the first bending section 171, which is the second follower bending section. As illustrated in FIG. 1, the second bending section 172 includes a wire guide 1721, which is a fixed member (a first follower fixed member) located most distal from the base 140 in the second bending section 172, and wires 1722, which are linear members (first follower linear members) fixed to the wire guide 1721 and driven by actuators which are drive units housed inside of the base 140. In the example illustrated in FIG. 1, the wires 1722 include three wires, and three actuators each corresponding to one of the three wires (actuators different from the three actuators corresponding to the three wires 1732) are housed inside of the base 140.

The first bending section 171 is a bending section located between the second bending section 172, which is the first follower bending section, and the base 140. As illustrated in FIG. 1, the first bending section 171 includes a wire guide 1711, which is a fixed member (a second follower fixed member) located most distal from the base 140 in the first bending section 171, and wires 1712, which are linear members (second follower linear members) fixed to the wire guide 1711 and driven by actuators, which are drive units housed inside of the base 140. In the example illustrated in FIG. 1, the wires 1712 include three wires, and three actuators each corresponding to one of the three wires are housed inside of the base 140 (three actuators different from the three actuators corresponding to the three wires 1732 and different from the three actuators corresponding to the three wires 1722).

A coordinate system used as a reference when control is performed to bend each of the bending sections 171 to 173 according to the present embodiment is described below.

To control the bending motion of the third bending section 173, a predetermined position on the wire guide 1721 of the second bending section 172 (for example, the position of the center of a surface of the wire guide 1721) is defined as an origin $O_3$, and reference axes $x_3$, $y_3$, and $z_3$ are set for the direction in which the wire guide 1721 is facing. Then, the bending motion is controlled on the basis of a first relative coordinate system 1730 that is a relative coordinate system in which the origin $O_3$ and the reference axes $x_3$, $y_3$, and $z_3$ relating to the wire guide 1721 vary in accordance with the movement of the continuum robot 100. More specifically, in the example illustrated in FIG. 1, the reference axes $x_3$ and $y_3$ are set so as to be orthogonal to each other in the surface direction of the wire guide 1721, and the reference axis $z_3$ is set in a direction that is orthogonal to the surface of the wire guide 1721 (orthogonal to the reference axes $x_3$ and $y_3$). In the example illustrated in FIG. 1, a bending angle $\theta\sim_3$ of the third bending section 173 in the first relative coordinate system 1730 is determined by the angle formed by a reference axis 101-3 corresponding to the reference axis $z_3$ and a direction orthogonal to the surface of the wire guide 1731 (the direction of a reference axis $z_4$), as illustrated in FIG. 1.

To control the bending motion of the second bending section 172, a predetermined position on the wire guide 1711 of the first bending section 171 (for example, the position of the center of a surface of the wire guide 1711) is defined as an origin $O_2$, and reference axes $x_2$, $y_2$, and $z_2$ are set for the direction in which the wire guide 1711 is facing. The bending motion is controlled on the basis of a second relative coordinate system 1720 that is a relative coordinate system in which the origin $O_2$ and the reference axes $x_2$, $y_2$, and $z_2$ relating to the wire guide 1711 vary in accordance with the movement of the continuum robot 100. More specifically, in the example illustrated in FIG. 1, the reference axes $x_2$ and $y_2$ are set so as to be orthogonal to each other in the surface direction of the wire guide 1711, and the reference axis $z_2$ is set in a direction that is orthogonal to the surface of the wire guide 1711 (orthogonal to the reference axes $x_2$ and $y_2$). As illustrated in FIG. 1, a bending angle $\theta\sim_2$ of the second bending section 172 in the second relative coordinate system 1720 is determined by the angle formed by a reference axis 101-2 corresponding to the reference axis $z_2$ and a direction orthogonal to the surface of the wire guide 1721 (the direction of the reference axis $z_3$).

To control the bending motion of the first bending section 171, a predetermined position on an upper surface 141 of the base 140 (for example, the position of the center of the upper surface 141 of the base 140) is defined as an origin $O_1$, and reference axes $x_1$, $y_1$, and $z_1$ are set for the direction in which the upper surface 141 of the base 140 is facing. The bending motion is controlled on the basis of a third relative coordinate system 1710 that is a relative coordinate system in which the origin $O_1$ and the reference axes $x_1$, $y_1$, and $z_1$ relating to the upper surface 141 of the base 140 vary in accordance with the movement of the continuum robot 100. More specifically, in the example illustrated in FIG. 1, the reference axes $x_1$ and $y_1$ are set so as to be orthogonal to each other in the surface direction of the upper surface 141 of the base 140, and a reference axis $z_1$ is set in a direction that is orthogonal to the upper surface 141 of the base 140 (orthogonal to the reference axes $x_1$ and $y_1$). As illustrated in FIG. 1, a bending angle $\theta\sim_1$ of the first bending section 171 in the third relative coordinate system 1710 is determined by the angle formed by a reference axis 101-1 corresponding to the reference axis $z_1$ and a direction orthogonal to the surface of the wire guide 1711 (the direction of the reference axis $z_2$).

The actuators (not illustrated in FIG. 1) which are drive units for driving the wires 1712 to 1732 of the bending sections 171 to 173 are provided inside of the base 140. In addition to the bending motions performed by the plurality of bending sections 171 to 173 that constitute the bendable unit 170, the continuum robot 100 can achieve movement (forward and backward movement) in the $z_1$ direction illustrated in FIG. 1. In this case, FIG. 1 illustrates a displacement $z_b$ of the base 140 as an index of the amount of movement of the continuum robot 100 in the $z_1$ direction (the amount of forward movement in the case of forward movement, for example). In FIG. 1, the dash line denotes a virtual wire that extends the wire orthogonal to the reference axis $x_1$ of the most proximal bending section 171 to the distal end along the shape of each of the bending sections. This wire is referred to as a "virtual reference wire". The reference axis x of each of the relative coordinate systems 1710 to 1730 is provided from the origin O of the relative coordinate system so as to be orthogonal to the virtual reference wire.

Figure 2:
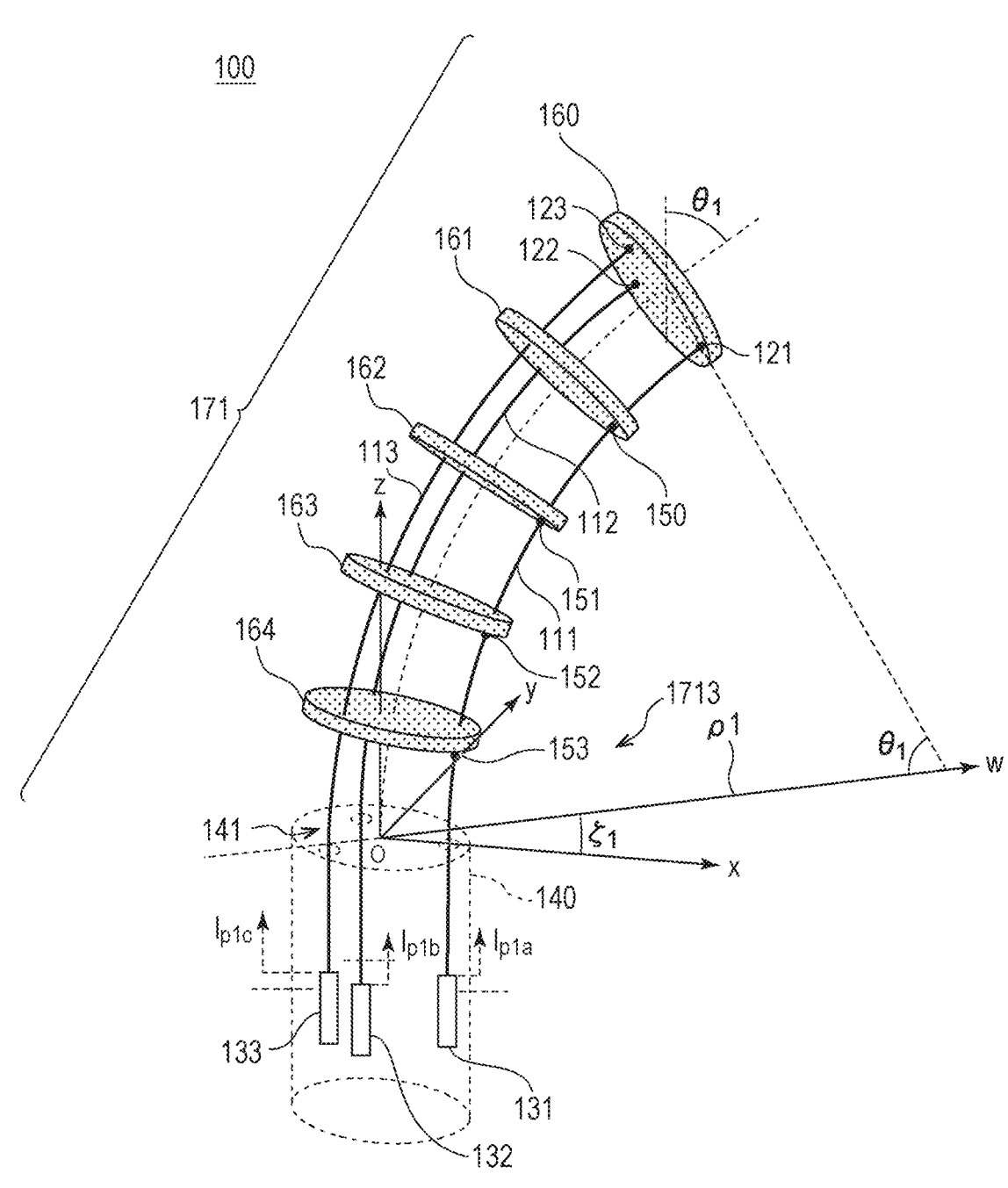
FIG. 2 illustrates an example of a detailed schematic configuration of one of bending sections in the schematic configuration of the continuum robot illustrated in FIG. 1.

FIG. 2 illustrates an example of a detailed schematic configuration of the bending section 171 in the schematic configuration of the continuum robot 100 illustrated in FIG. 1. That is, FIG. 2 illustrates a detailed schematic configuration of the bending section 171 at the proximal end (the configuration located closest to the base 140). In FIG. 2, configurations similar to those illustrated in FIG. 1 are identified by the same reference numerals, and the detailed description of the configurations is omitted. In FIG. 2, the bending angle of the bending section 171 is denoted by the symbol $\theta_1$, the turning angle of the bending section 171 is denoted by the symbol $\zeta_1$, and the radius of curvature of the bending section 171 (corresponding to a line segment connecting point O and a point w in FIG. 2) is denoted by the symbol $\rho 1$. In FIG. 2, the bending angle $\theta_1$ of the bending section 171 is defined in an absolute coordinate system 1713 in which a predetermined position (for example, the center position) on the upper surface 141 of the base 140 is defined as the origin O, and the reference axes x, y, and z are set for the direction in which the upper surface 141 of the base 140 is facing. If the direction in which the upper surface 141 of the base 140 is facing and the like do not vary, the absolute coordinate system 1713 illustrated in FIG. 2 is equivalent to the third relative coordinate system 1710 illustrated in FIG. 1.

As illustrated in FIG. 2, in the continuum robot 100, wires 111 to 113 are fixedly connected to connecting portions 121 to 123 of the wire guide 160 located at the distal end of the bending section 171, respectively. The wire guide 160 in FIG. 2 corresponds to the wire guide 1711 in FIG. 1, and the wires 111 to 113 in FIG. 2 correspond to the wires 1712 in FIG. 1. The posture (bending shape) of the bending section 171 is controlled by the wires 111 to 113 illustrated in FIG. 2 being pushed and pulled by the actuators 131 to 133 installed inside the base 140, respectively. The actuator 131 is a drive unit for driving the wire 111, and the actuator 132 is a drive unit for driving the wire 112, and the actuator 133 is a drive unit for driving the wire 113. As illustrated in FIG. 2, the continuum robot 100 further includes wire guides 161 to 164, which are members for guiding the wires 111 to 113 in the bending section 171. Instead of using a technique of discretely arranging a plurality of members, the wire guides 161 to 164 may be made as an accordion-shaped or mesh-shaped continuum member. In the example illustrated in FIG. 2, the wire 111 is fixed at fixing portions 150 to 153 of the wire guides 161 to 164, respectively. In FIG. 2, the central axis of the continuum robot 100 is denoted by a dash line.

According to the present embodiment, the wires 111 to 113 are referred to as a-wire, b-wire, and c-wire, respectively, counterclockwise in the x-y plane. More specifically, in the example illustrated in FIG. 2, the wire 111 corresponds to the a-wire, and the driving displacement (driving amount) of the wire 111 in the bending section 171 by the push and pull of the actuator 131 is denoted by $l_{p1a}$. In the example illustrated in FIG. 2, the wire 112 corresponds to the b-wire, and the driving displacement (driving amount) of the wire 112 in the bending section 171 by the push and pull of the actuator 132 is denoted by $l_{p1b}$. Furthermore, in the example illustrated in FIG. 2, the wire 113 corresponds to the c-wire, and the driving displacement (driving amount) of the wire 113 in the bending section 171 by the push and pull of the actuator 133 is denoted by $l_{p1c}$.

In the example illustrated in FIG. 2, only the detailed schematic configuration related to the bending section 171 is illustrated and described. In this regard, like the detailed schematic configuration related to the bending section 171 illustrated in FIG. 2, each of the bending section 172 and the bending section 173 illustrated in FIG. 1 is configured to include wires corresponding to the wires 111 to 113, actuators corresponding to the actuators 131 to 133, a wire guide corresponding to the wire guide 160 at the distal end, and wire guides corresponding to the wire guides 161 to 164. For generalization, the driving displacements (driving amounts) of the a- to c-wires that drive the n-th bending section are referred to as $l_{pna}$, $l_{pnb}$, and $l_{pnc}$, respectively.

Figure 3:
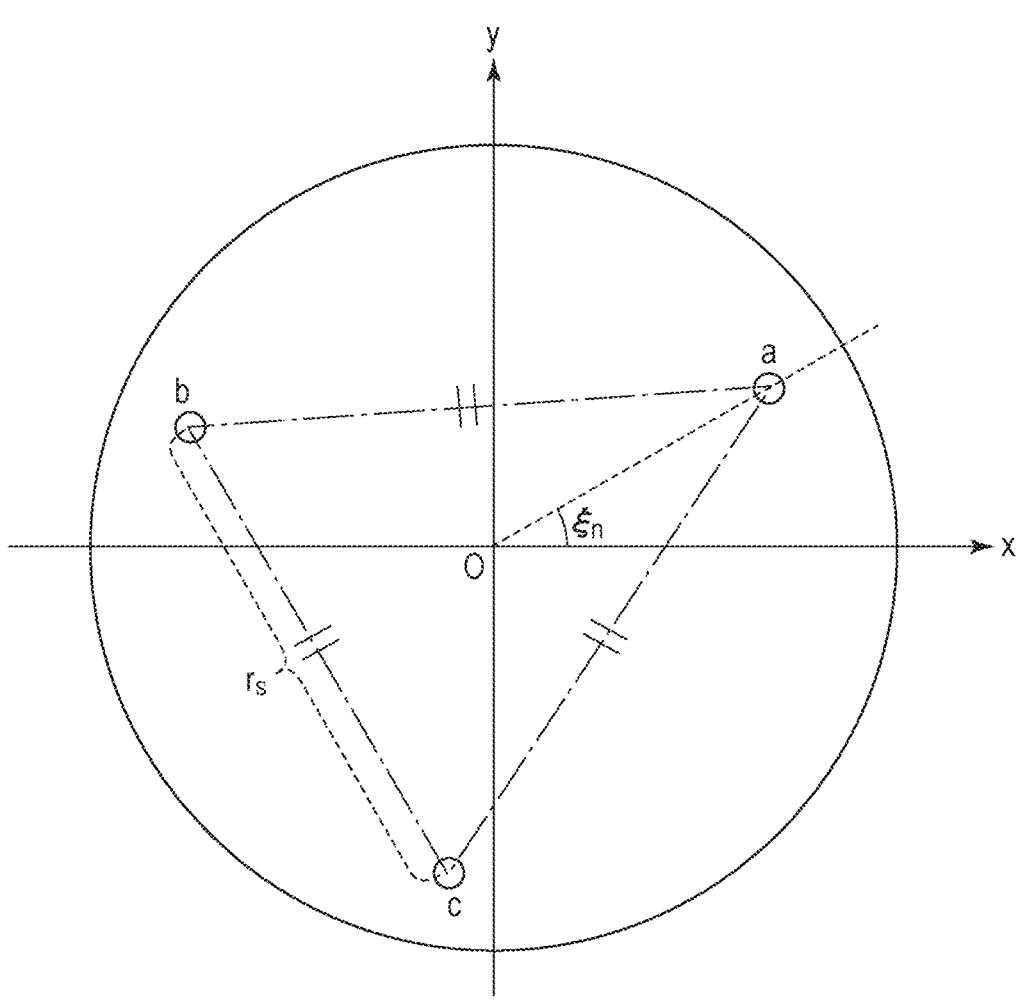
FIG. 3 illustrates an example of the arrangement of three wires (a-wire to c-wire) illustrated in FIG. 2 in the x-y plane.

FIG. 3 illustrates an example of the arrangement of the three wires 111 to 113 (a-wire to c-wire) illustrated in FIG.

2 in the x-y plane. As illustrated in FIG. 3, the three wires 111 to 113 (a-wires to c-wires) illustrated in FIG. 2 are disposed at the vertices of an equilateral triangle where the length of the side is $r_s$, and the phase angle $\xi_n$ illustrated in FIG. 3 is the angle that determines the arrangement of the wires that drive the n-th bending section.

Figure 4:
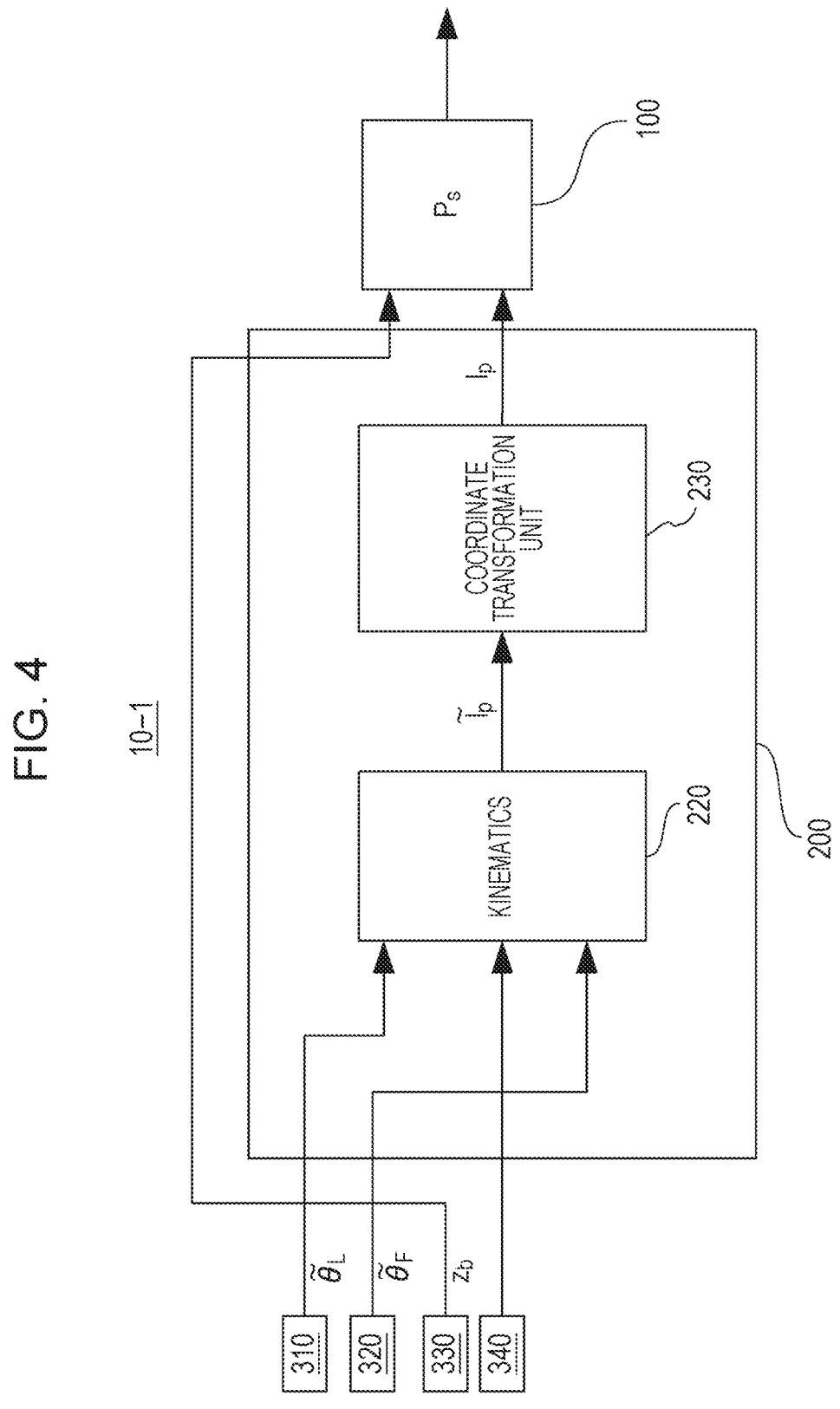
FIG. 4 illustrates an example of a schematic configuration of a continuum robot control system according to the first embodiment of the present disclosure.

FIG. 4 illustrates an example of a schematic configuration of a continuum robot control system 10-1 according to the first embodiment of the present disclosure. As illustrated in FIG. 4, the continuum robot control system 10-1 includes the continuum robot 100, a control unit 200, and various input devices 310 to 340.

The input device 310 is a device that inputs, to the control unit 200, a target bending angle $\theta\sim_L$ of the most distal bending section in the relative coordinate system. More specifically, in the example illustrated in FIG. 1, the input device 310 inputs a target bending angle $\theta\sim_3$ of the third bending section 173 in the first relative coordinate system 1730 to the control unit 200 as the target bending angle $\theta\sim_L$ of the most distal bending section in the first relative coordinate system 1730. In addition to the target bending angle $\theta\sim_L$ of the most distal bending section in the relative coordinate system, the input device 310 may input a target turning angle $\zeta\sim_L$ of the most distal bending section in the relative coordinate system to the control unit 200.

The input device 320 is a device that inputs a target bending angle $\theta\sim_F$ of a follower bending section in the relative coordinate system to the control unit 200. More specifically, in the example illustrated in FIG. 1, the input device 320 inputs the target bending angle $\theta\sim_2$ of the second bending section 172 in the second relative coordinate system 1720 to the control unit 200 as the target bending angle $\theta\sim_F$ of the follower bending section (first follower bending section) in the second relative coordinate system 1720. Furthermore, the input device 320 may input, to the control unit 200, a target bending angle $\theta\sim_1$ of the first bending section 171 in the third relative coordinate system 1710 as the target bending angle $\theta\sim_F$ of the second follower bending section in the third relative coordinate system 1710.

The input device 330 is a device that inputs, to the control unit 200, the displacement $z_b$ of the base 140 in the movement direction of the continuum robot 100 (for example, the direction of forward movement) and also controls the base 140 of the continuum robot 100 to move in the z direction by the displacement $z_b$.

The input device 340 is a device that inputs various types of information to the control unit 200. More specifically, for example, in the example illustrated in FIG. 1, the input device 340 inputs, to the control unit 200, information, such as the length l of the third bending section 173, which is the most distal bending section, and the length l of the second bending section 172, which is the follower bending section (the length l of the second bending section 172 may include the length l of the first bending section 171).

The control unit 200 is a unit that controls the motion of the continuum robot 100. As illustrated in FIG. 4, the control unit 200 includes a kinematics calculation unit (Kinematics) 220 and a coordinate transformation unit 230.

The kinematics calculation unit 220 is calculation means for, when the wires of the bending sections are driven by the actuators which are the drive units, calculating the driving displacements (driving amounts) of the wires for each of the bending sections in a corresponding relative coordinate system. More specifically, the kinematics calculation unit 220 calculates the driving displacement (driving amount) $l\sim_{pL}$ of the wire 1732, which is the distal linear member in the relative coordinate system, and the driving displacement (driving amount) $1\sim_{pF}$ of the wire 1722, which is the follower linear member in the relative coordinate system and may include the wire 1712, on the basis of the target bending angle $\theta\sim_L$ of the most distal bending section in the relative coordinate system input from the input device 310 and the target bending angle $\theta\sim_F$ of the follower bending section in the relative coordinate system input from the input device 320. In FIG. 4, the driving displacement (driving amount) $1\sim_{pL}$ of the distal linear member and the driving displacement (driving amount) $1\sim_{pF}$ of the follower linear member in the relative coordinate system are collectively denoted as the driving displacement (driving amount) $1\sim_p$ of the linear member (wire) in the relative coordinate system.

The coordinate transformation unit 230 is transformation means for transforming the driving displacement (driving amount) $1\sim_{pL}$ of the distal linear member and the driving displacement (driving amount) $1\sim_{pF}$ of the follower linear member in the relative coordinate system obtained by the kinematics calculation unit 220 into the driving displacement (driving amount) $1_{pL}$ of the distal linear member and the driving displacement (driving amount) $1_{pF}$ of the follower linear member in the absolute coordinate system, respectively. In FIG. 4, the driving displacement (driving amount) $1_{pL}$ of the distal linear member and the driving displacement (driving amount) $1_{pF}$ of the follower linear member in the absolute coordinate system are collectively denoted as the driving displacement (driving amount) $1_p$ of the linear member (wire) in the absolute coordinate system.

Then, based on the driving displacement (driving amount) $1_{pL}$ of the distal linear member and the driving displacement (driving amount) $1_{pF}$ of the follower linear member in the absolute coordinate system obtained by the coordinate transformation unit 230, the control unit 200 controls the corresponding actuators (the drive units of the continuum robot 100). That is, the control unit 200 controls the bending motions of the distal bending section (the most distal bending section) and the follower bending section on the basis of the driving displacement (driving amount) $1_{pL}$ of the distal linear member and the driving displacement (driving amount) $1_{pF}$ of the follower linear member in the absolute coordinate system.

According to the present embodiment, all the phase angles $\xi_n = 0$. The control performed by the control unit 200 in the $x_1$-$z_1$ plane is described first.

Modeling

In the present chapter, the kinematics of the continuum robot 100 in the $x_1$-$z_1$ plane is derived. The definitions of the symbols used in the present chapter are as follows:

$1_n$: Length of the n-th bending section, $r_n$: Distance from the wire passing through the wire guide of the n-th bending section to the center of the wire guide, e: Number of bending sections in the bendable unit 170 of the continuum robot 100, $\theta_n$: Target bending angle (at the distal end) of the n-th bending section, $\theta\sim_n$: Target bending angle (at the distal end) of the n-th bending section in the relative coordinate system, $\rho n$: Radius of curvature of the n-th bending section, $1_{pn}$: Driving displacement (driving amount) of the wire of the n-th bending section, $1\sim_{pn}$: Driving displacement (driving amount) of the wire in the n-th bending section in the relative coordinate system, $x_{tn}$, $z_{tn}$: Coordinates of the distal end of the n-th bending section, and $z_b$: Displacement of the base 140.

Figure 5:
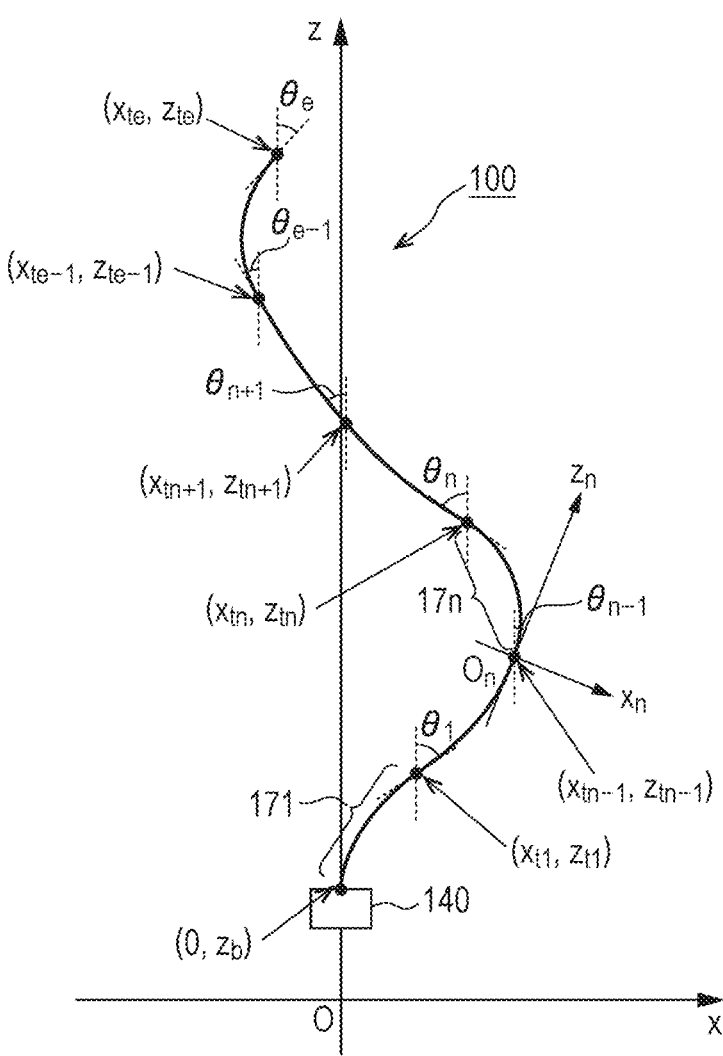
FIG. 5 illustrates the first embodiment of the present disclosure and illustrates an example of the kinematic model of the continuum robot illustrated in FIG. 1.
Figure 6:
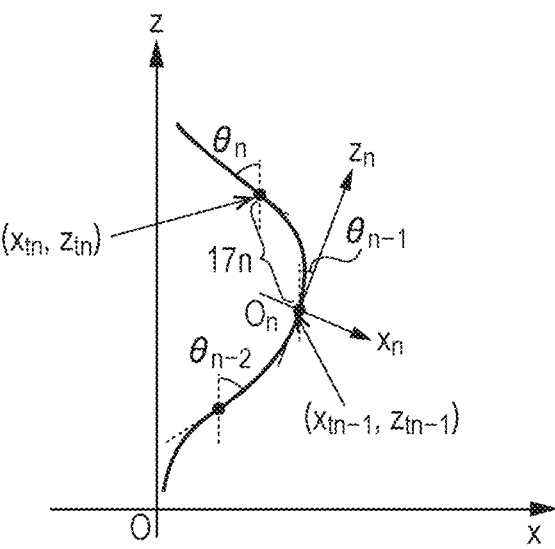
FIG. 6 illustrates the first embodiment of the present disclosure and illustrates an example of the kinematic model of the continuum robot illustrated in FIG. 1.

FIGS. 5 and 6 illustrate the first embodiment of the present disclosure and illustrate an example of the kinematic model of the continuum robot 100 illustrated in FIG. 1. Like FIG. 2, FIGS. 5 and 6 are illustrated based on the absolute coordinate system. In FIG. 5, configurations similar to those illustrated in FIGS. 1 and 2 are identified by the same reference numerals, and the detailed description of the configurations is omitted.

According to the present embodiment, the kinematics of the continuum robot 100 in which the number of bending sections illustrated in FIG. 5 is e is derived under the following assumptions:

1. The wire deforms only in the $x_1$-$z_1$ plane.
2. In each of the bending sections, the wire deforms with constant curvature.
3. Torsional deformation of the wire is not taken into account.
4. The wire is not deformed in the longitudinal direction.

The first bending section (corresponding to the bending section 171 in FIGS. 1 and 2) is discussed first.

When the a-wire is driven with the b- and c-wires being fixed, the relationship between the driving displacement (driving amount) $1_{p1}$ of the wire and the (distal end) bending angle $\theta_1$ of the first bending section is given as follows:

$$l_{p1} = \frac{3}{2} r_1 \theta_1 \qquad (1)$$

Subsequently, the relationship between the driving displacement (driving amount) $1_{pn}$ of the wire in the n-th bending section 17n and the bending angle $\theta_n$ at the distal end of the n-th bending section 17n is derived, where n is greater than or equal to two. The bending angle $\theta\sim_n$ of the n-th bending section 17n (at the distal end) in the relative coordinate system is defined as follows:

$$\theta\sim_n = \theta_n - \theta_{n-1}. \qquad (2)$$

As illustrated in FIG. 5, the coordinates of the origin $O_n$ of the n-th bending section 17n is denoted as $(x_{tn-1}, z_{tn-1})$, and a relative coordinate system $x_n$-$z_n$ based on the $\theta_{n-1}$ direction and its orthogonal direction is taken. Then, the relationship between the driving displacement (driving amount) $1\sim_{pn}$ of the wire in the relative coordinate system $x_n$-$z_n$ and the bending angle $\theta\sim_n$ of the n-th bending section 17n (at the distal end) is given as follows:

$$\tilde{l}_{pn} = \frac{3}{2} r_n \theta_n \qquad (3)$$

The driving displacement (driving amount) $1_{pn}$ of the wire in the n-th bending section 17n is the sum of the driving displacements (driving amounts) of the wire for driving the n-th bending section in the relative coordinate system in the first bending section 171 to the (n−1)th bending section, and is expressed by the following equations (4) and (5):

$$l_{pn} = \tilde{l}_{pn} + \tilde{l}_{pn-1} + \dots + \tilde{l}_{p1} \qquad (4)$$

$$= \frac{3}{2} r_n (\tilde{\theta}_n + \tilde{\theta}_{n-1} + \dots + \theta_1) = \frac{3}{2} r_n \theta_n \qquad (5)$$

As can be seen from the Expressions, the bending angle $\theta_n$ of the n-th bending section 17n (at the distal end) is determined only by the driving displacement (driving amount) $l_{pn}$ of the wire and does not depend on the angles of the intermediate bending sections.

Subsequently, the relationship between the (distal end) bending angle of the n-th bending section 17n and the coordinates of the distal end thereof is derived. The first bending section 171 is first discussed. The relationship between the bending angle $\theta_1$ of the first bending section 171 at the distal end and the coordinates $(x_{t1}, z_{t1})$ of the distal end is given as follows:

$$x_{t1} = \frac{l_1}{\theta_1}(1 - \cos\theta_1) \tag{6}$$

$$z_{t1} = \frac{l_1}{\theta_1}\sin\theta_1 \tag{7}$$

Subsequently, the relationship between the (distal end) bending angle $\theta\sim_n$ of the n-th bending section 17n in the relative coordinate system and the coordinates of the distal end $(x\sim_{tm}, z\sim_{tm})$ in the relative coordinate system $x_n$-$z_n$ are given as follows:

$$\tilde{x}_{tm} = \frac{l_n}{\tilde{\theta}_n}\left(1 - \cos\tilde{\theta}_n\right) \tag{8}$$

$$\tilde{z}_{tm} = \frac{l_n}{\tilde{\theta}_n}\sin\tilde{\theta}_n \tag{9}$$

Therefore, by using a rotation transformation matrix, the coordinates $(x_{tm}, z_{tm})$ of the distal end in the absolute coordinate system are given as follows:

$$\begin{bmatrix} x_{tm} \\ z_{tm} \end{bmatrix} = \begin{bmatrix} x_{t1} \\ z_b + z_{t1} \end{bmatrix} + \sum_{m=2}^{n} \begin{bmatrix} \cos\theta_{m-1} & \sin\theta_{m-1} \\ -\sin\theta_{m-1} & \cos\theta_{m-1} \end{bmatrix} \begin{bmatrix} \frac{l_m}{\tilde{\theta}_m}(1 - \cos\tilde{\theta}_m) \\ \frac{l_m}{\tilde{\theta}_m}\sin\tilde{\theta}_m \end{bmatrix}. \tag{10}$$

According to the present embodiment, the target bending angle of each of the bending sections based on the relative coordinate system is provided to the control unit 200. Therefore, the control unit 200 can calculate the driving displacement (driving amount) of the wire in each of the bending sections in the relative coordinate system from the target bending angle of each of the bending sections in the relative coordinate system by using the relationship described in Expression (3). The calculation process using Expression (3) is performed by the kinematics calculation unit 220 illustrated in FIG. 4. The control unit 200 can then use Expression (4) to transform the driving displacement (driving amount) of the wire of each of the bending sections in the relative coordinate system obtained using Expression (3) into the driving displacement (driving amount) of the wire of the bending section in the absolute coordinate system. The transformation process using Expression (4) is performed by the coordinate transformation unit 230 illustrated in FIG. 4. The control unit 200 can then control the shape of the bendable unit 170 of the continuum robot 100 by providing, to an actuator serving as a drive unit, the driving displacement (driving amount) of the wire of each of the bending sections in the absolute coordinate system obtained using Expression (4) as the target driving displacement (target driving amount).

The control unit 200 of the continuum robot control system 10-1 according to the first embodiment performs the processes described below.

The control unit 200 defines, as the origin $O_3$, a predetermined position on the wire guide 1721, which is a follower fixed member (first follower fixed member) of the second bending section 172, which is a follower bending section (first follower bending section) and sets the reference axes $x_3$, $y_3$, and $z_3$ for the direction in which the wire guide 1721 is facing. Then, the control unit 200 causes the actuator serving as the drive unit of the continuum robot 100 to drive the wire 1732, which is a distal linear member of the third bending section 173, so that the third bending section 173, which is a distal bending section, is bent, on the basis of the relative coordinate system (first relative coordinate system) 1730 in which the origin $O_3$ and the reference axes $x_3$, $y_3$, and $z_3$ relating to the wire guide 1721 vary in accordance with the movement of the continuum robot 100.

Such a configuration enables an operator to perform an intuitive operation even when, for example, a camera is provided at the most distal end of the continuum robot 100, and then, the operator who cannot look down on the continuum robot 100 operates the bendable unit 170 of the continuum robot 100 while observing the camera image. As a result, the bendable unit 170 of the continuum robot 100 is less likely to come in contact with surrounding obstacles in a narrow space and easily enter a desired path.

Furthermore, the control unit 200 of the continuum robot control system 10-1 according to the first embodiment performs the processes described below.

The control unit 200 defines, as the origin $O_2$, a predetermined position on the wire guide 1711, which is a follower fixed member of the first bending section 171, which is the second follower fixed member, and sets the reference axes $x_2$, $y_2$, and $z_2$ for the direction in which the wire guide 1711 is facing. Then, the control unit 200 causes an actuator serving as a drive unit of the continuum robot 100 to drive the wire 1722, which is the first follower linear member of the second bending section 172, on the basis of the second relative coordinate system 1720 in which the origin $O_2$ and the reference axes $x_2$, $y_2$, and $z_2$ relating to the wire guide 1711 vary in accordance with the movement of the continuum robot 100 so that the second bending section 172, which is the first follower bending section, is bent following the bending motion of the third bending section 173, which is the distal bending section.

Such a configuration enables an operator to perform an intuitive operation even when, for example, a camera is provided at the most distal end of the continuum robot 100, and then, the operator who cannot look down on the continuum robot 100 operates the bendable unit 170 of the continuum robot 100 while observing the camera image.

The control unit 200 of the continuum robot control system 10-1 according to the first embodiment further includes the kinematics calculation unit 220 and the coordinate transformation unit 230 that perform the processes described below.

The kinematics calculation unit 220 calculates the driving displacement (driving amount) $l\sim_{pL}$ of the wire 1732, which is the distal linear member, and the driving displacement (driving amount) $l\sim_{pF}$ of the wire 1722, which is a follower linear member (and which may include the wire 1712), in the relative coordinate system on the basis of the input target bending angle $\theta\sim_L$ of the distal bending section (the most distal bending section) and the input target bending angle $\theta\!\sim_F$ of the follower bending section in the relative coordinate system.

The coordinate transformation unit 230 transforms the driving displacement (driving amount) $1\!\sim_{pL}$ of the distal linear member and the driving displacement (driving amount) $1\!\sim_{pF}$ of the follower linear member in the relative coordinate system obtained by the kinematics calculation unit 220 into the driving displacement (driving amount) $1_{pL}$ of the distal linear member and the driving displacement (driving amount) $1_{pL}$ of the follower linear member in the absolute coordinate system, respectively. According to the present embodiment, when obtaining the driving displacement (driving amount) $1_{pL}$ of the distal linear member in the absolute coordinate system, the coordinate transformation unit 230 uses Expression (4) to add the driving displacement (driving amount) $1\!\sim_{pF}$ of the follower linear member to the driving displacement (driving amount) $1\!\sim_{pL}$ of the distal linear member in the relative coordinate system obtained by the kinematics calculation unit 220. The coordinate transformation unit 230 can also use Expression (4) to perform similar addition when obtaining the driving displacement (driving amount) $1_{pL}$ of the follower linear member in the absolute coordinate system.

Then, the control unit 200 controls the corresponding actuators serving as the drive units of the continuum robot 100 on the basis of the driving displacement (driving amount) $1_{pL}$ of the distal linear member and the driving displacement (driving amount) $1_{pF}$ of the follower linear member in the absolute coordinate system obtained by the coordinate transformation unit 230.

The first embodiment also includes a method for processing performed by the continuum robot control system 10-1 (a continuum robot control method).

Second Embodiment

The second embodiment of the present disclosure is described below. In the description of the second embodiment below, description of matters in common with the first embodiment described above is omitted, and matters that differ from those described above in the first embodiment are described.

According to the second embodiment, a leader following control system is designed based on the control using the relative coordinate system described in the first embodiment above.

Figure 7:
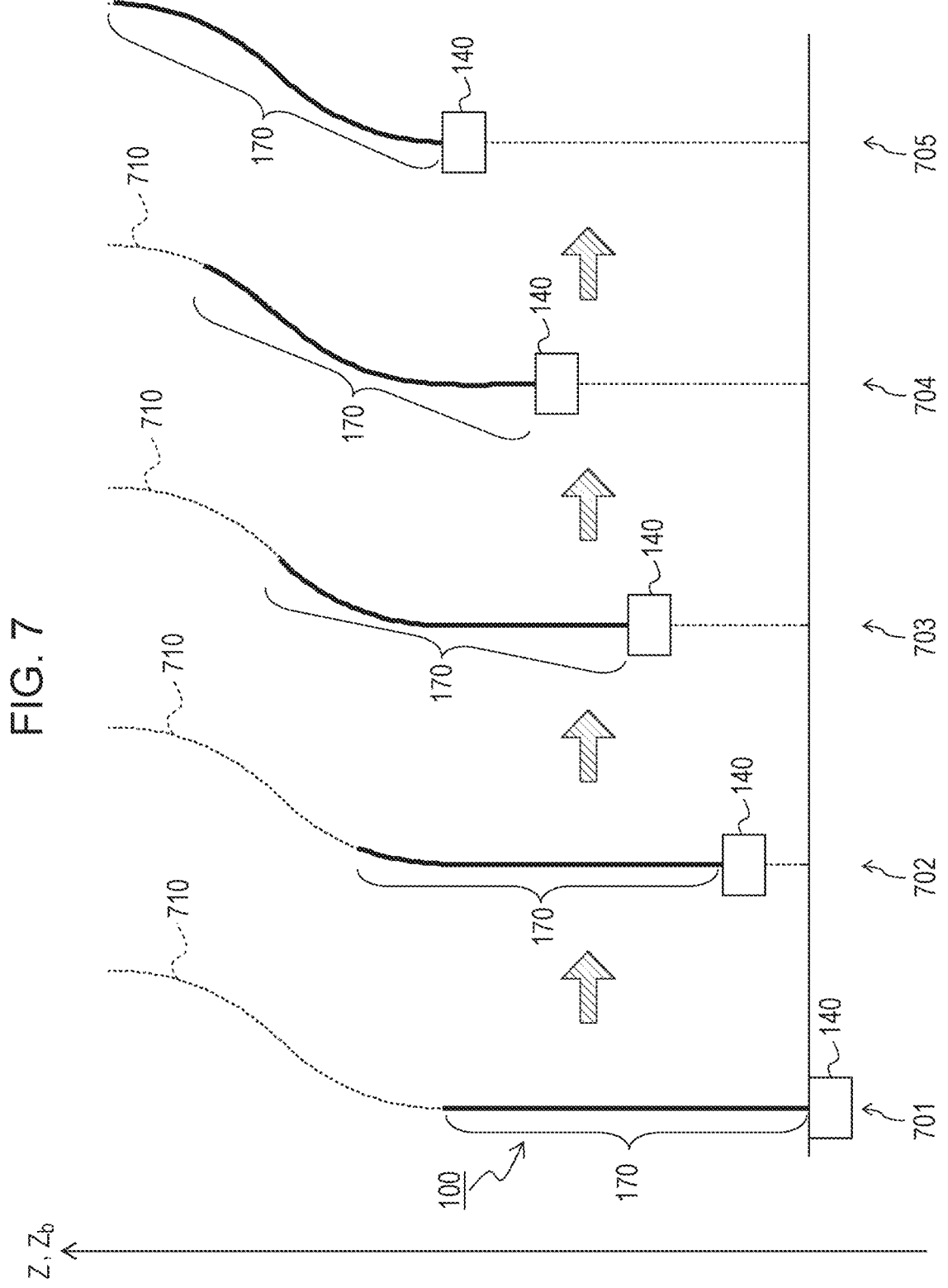
FIG. 7 illustrates an example of leader following control of the continuum robot according to a second embodiment of the present disclosure.

FIG. 7 illustrates an example of the leader following control of the continuum robot 100 according to the second embodiment of the present disclosure. In FIG. 7, configurations similar to those illustrated in FIGS. 1 and 2 are identified by the same reference numerals. In addition, the $z_b$ direction illustrated in FIG. 1 is the direction from bottom to top in FIG. 7. Furthermore, in FIG. 7, a target path 710 along which the continuum robot 100 including the base 140 and the bendable unit 170 moves is denoted by a dotted line.

As used herein, the term "leader following control" refers to a method for controlling the follower bending section to move along the same path as the path (the target path 710) along which the most distal bending section of the bendable unit 170 moved, as illustrated in FIG. 7.

In FIG. 7, a time point 701 indicates the initial state in which the bendable unit 170 extends from the upper surface of the base 140 in the z direction without bending. Thereafter, as illustrated in FIG. 7, as time passes from a time point 702, to a time point 703, to a time point 704, and then to a time point 705, the base 140 moves in the z direction, and the bendable unit 170 is being bent.

Such a leader following control enables the continuum robot 100 to slip through a narrow space. The leader following control does not require that the target path 710 be defined in advance. For example, the bending angle of the most distal bending section may be continuously propagated so as to be the bending angle of the follower bending section over the length of the bending section. This method allows the operator to perform the leader following control on the continuum robot 100 in real time by providing a command regarding only the bending angle of the most distal bending section and the displacement (the amount of movement (advancement amount)) of the base 140 using a joystick or the like.

Figure 8:
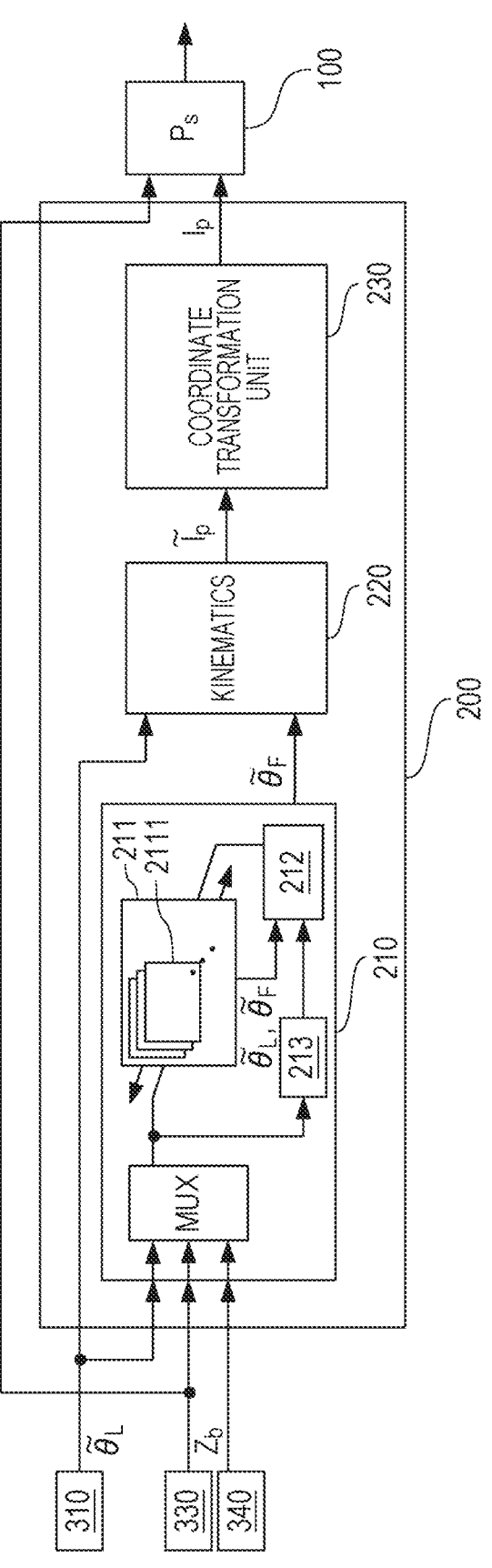
FIG. 8 illustrates an example of a schematic configuration of a continuum robot control system according to the second embodiment of the present disclosure.

FIG. 8 illustrates an example of the schematic configuration of a continuum robot control system 10-2 according to the second embodiment of the present disclosure. In FIG. 8, configurations similar to those illustrated in FIG. 4 are identified by the same reference numerals, and the detailed description of the configurations is omitted.

As illustrated in FIG. 8, the continuum robot control system 10-2 includes a continuum robot 100, a control unit 200, and various input devices 310, 330, and 340.

The control unit 200 is a unit that controls the motion of the continuum robot 100. As illustrated in FIG. 8, the control unit 200 includes an angle calculation unit 210, a kinematics calculation unit 220, and a coordinate transformation unit 230. That is, the control unit 200 according to the second embodiment illustrated in FIG. 8 includes an angle calculation unit 210 additionally provided in the configuration of the control unit 200 according to the first embodiment illustrated in FIG. 4.

The angle calculation unit 210 is calculation means for calculating the target bending angle $\theta\!\sim_r$ of the follower bending section in the relative coordinate system after a change in the target bending angle $\theta\!\sim_L$ of the most distal bending section in the relative coordinate system on the basis of the target bending angle $\theta\!\sim_L$ of the most distal bending section in the relative coordinate system input from the input device 310, the displacement $z_b$ of the base 140 input from the input device 330, and a length 1 of the follower bending section input from the input device 340. As illustrated in FIG. 8, the angle calculation unit 210 includes a storage unit 211, a reference table rewriting unit 212, and an information input unit 213. The storage unit 211 is storage means for storing a plurality of different reference tables 2111 each indicating the relationship between a pair of the target bending angle $\theta\!\sim_L$ of the most distal bending section and the target bending angle $\theta\!\sim_F$ of the follower bending section in the relative coordinate system and the displacement $z_b$ of the base 140 and various types of information necessary for the processing performed by the angle calculation unit 210. The information input unit 213 is information input means for inputting, to the reference table rewriting unit 212, information regarding the length 1 of the bending section and information specifying the reference table 2111 to be used, which are input from the input device 340. The reference table rewriting unit 212 selects, from among the plurality of reference tables 2111 stored in the storage unit 211, one of the reference tables 2111 to be used on the basis of the information input from the information input unit 213 and rewrites the selected reference table 2111 in accordance with a change in the target bending angle $\theta\!\sim_L$ of the most distal bending section in the relative coordinate system and the displacement $z_b$ of the base 140.

Then, the kinematics calculation unit 220 calculates, based on the target bending angle $\theta\sim_L$ of the most distal bending section in the relative coordinate system input from the input device 310 and the target bending angle $\theta\sim_F$ of the follower bending section in the relative coordinate system calculated and output by the angle calculation unit 210, the driving displacement (driving amount) $l\sim_{pL}$ of the wire 1732, which is a distal linear member, in the relative coordinate system and the driving displacement (driving amount) $l\sim_{pF}$ of the wire 1722, which is the follower linear member (and which may include the wire 1712), in the relative coordinate system. In FIG. 8, like FIG. 4, the driving displacement (driving amount) $l\sim_{pL}$ of the distal linear member and the driving displacement (driving amount) $l\sim_{pF}$ of the follower linear member in the relative coordinate system are collectively denoted as the driving displacement (driving amount) $l\sim_p$ of the linear member (wire) in the relative coordinate system.

1) Control System Design 1.1) Leader Following Control

Figure 9A:
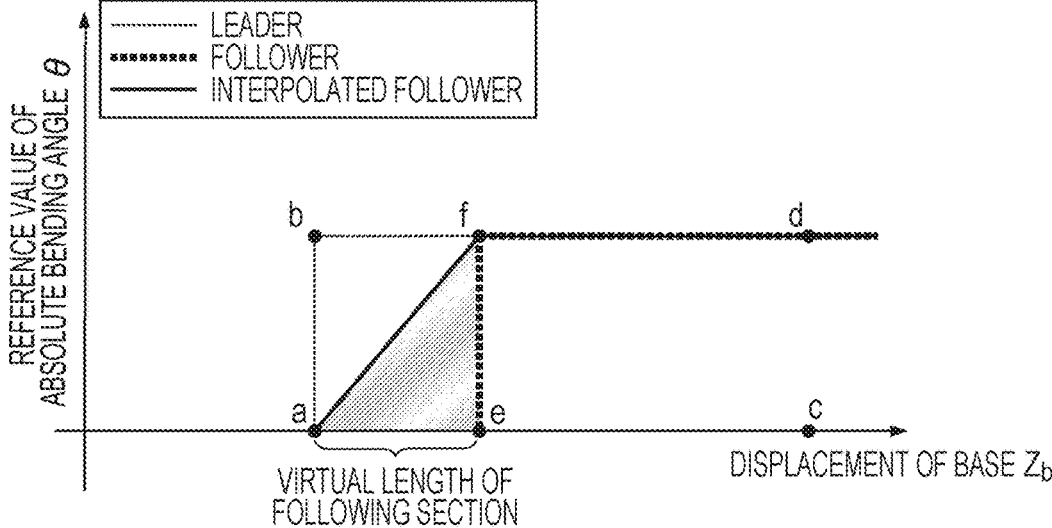
FIG. 9A illustrates the second embodiment of the present disclosure and illustrates the leader following control performed by a control unit illustrated in FIG. 8.
Figure 9B:
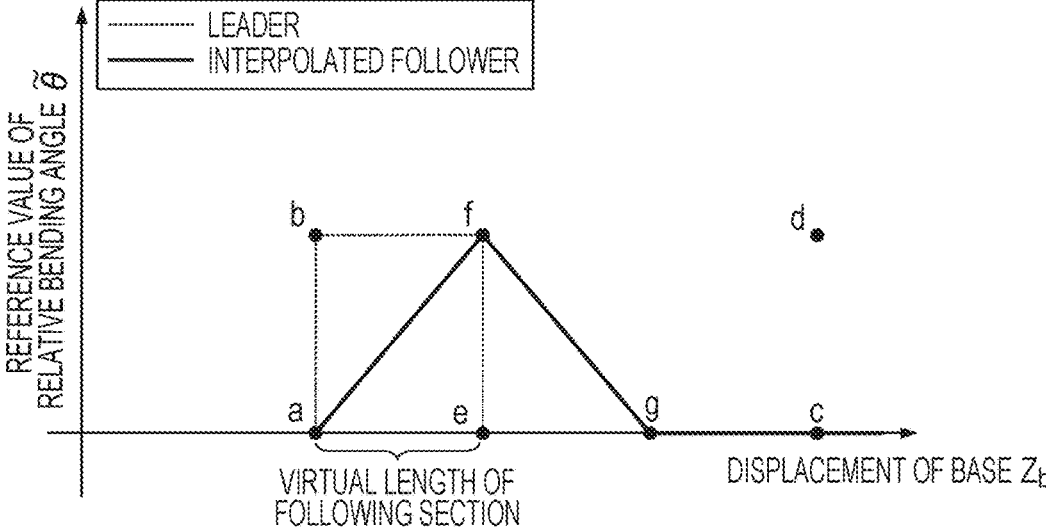
FIG. 9B illustrates the second embodiment of the present disclosure and illustrates the leader following control performed by the control unit of FIG. 8.
Figure 9C:
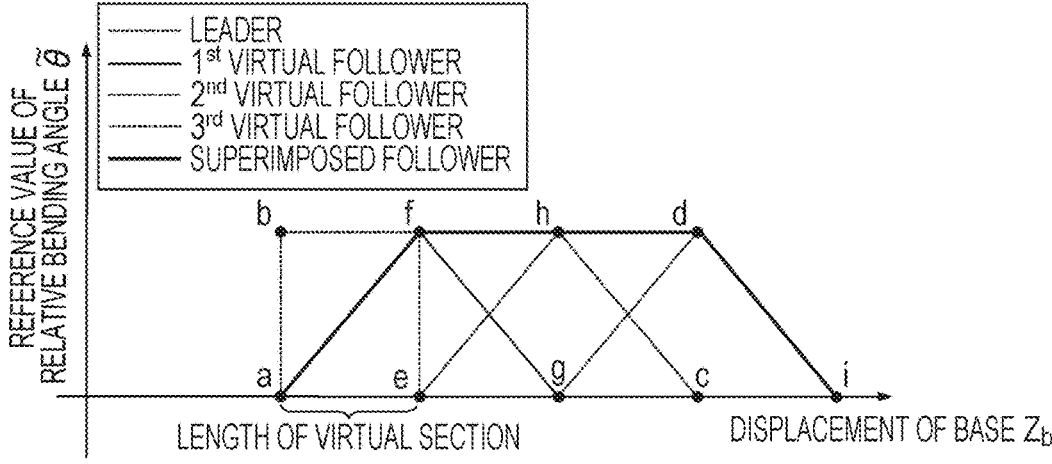
FIG. 9C illustrates the second embodiment of the present disclosure and illustrates the leader following control performed by the control unit illustrated FIG. 8.

FIGS. 9A to 9C illustrate the second embodiment of the present disclosure and illustrate the leader following control performed by the control unit 200 illustrated in FIG. 8.

FIG. 9A is a graph in which the abscissa axis represents the displacement $z_b$ of the base 140, and the ordinate axis represents the bending angle $\theta$ in the absolute coordinate system. In FIG. 9A, the dash line denotes a bending angle command (a target bending angle) for the most distal bending section from the operator (Leader), and the thick dash line denotes a bending angle command (a target bending angle) for the follower bending section (Follower). If, in FIG. 9A, a bending angle command ab for the most distal bending section is given by the operator at the displacement a of the base 140, the bending angle of the follower bending section can be automatically generated so as to be cd at a displacement c of the base 140, for example. At this time, the displacement c of the base 140 is determined so that the distance ac is, for example, the length l of the follower bending section. Then, the bending angle command for the follower bending section is stored in the storage unit 211 of the control unit 200 and is read out in accordance with the displacement $z_b$ of the base 140. If the number of bending sections in the bendable unit 170 is three or greater, the above-described follower bending section is replaced with the most distal bending section, and the process is continuously performed. Thus, the bending angle commands for all the bending sections can be obtained.

However, in the case of such a bending angle command, when the displacement $z_b$ of the base 140 is between the points a and c, the bending angle of the follower bending section does not vary, and the bending angle command for the follower bending section rises at the displacement c of the base 140, so that the continuum robot 100 behaves abruptly. Therefore, the bending angle command of the follower bending section can be interpolated such that the points a and d illustrated in FIG. 9A are connected.

However, when the length of the follower bending section is greater than the length of the most distal bending section, the base 140 moves forward with the bending angle of the follower bending section being shallow. Thus, the bendable unit 170 is likely to come in contact with surrounding obstacles. For this reason, according to PTL 1, as illustrated in FIG. 9A, the displacement e of the base 140 at which the bending angle of the follower bending section rises is determined so that the distance ae is less than the actual length l of the follower bending section, and the distance ae is set to a virtual length of the follower bending section.

Thus, a command is made so that the bending angle of the follower bending section is get closer to the bending angle of the most distal bending section, which facilitates entry into a narrow space path. According to PTL 1, to perform the interpolation method, a right triangle that is hatched in FIG. 9A is generated, where the length of the base of the right triangle is set to the virtual length of the follower bending section, the height is the distance ab, and the base of the right triangle is made coincident with a line segment ae. In addition, according to PTL 1, at each of points of the displacement $z_b$ of the base 140 from the point a to the point e, the intersection point of a straight line orthogonal to the coordinate axis of the displacement $z_b$ of the base 140 and the hypotenuse of the right triangle is obtained, and the length from the intersection point to the base of the right triangle is added to the bending angle command of the follower bending section denoted by the thick dash line. Thus, the target bending angle is generated by interpolation. In FIG. 9A, the interpolated target bending angle of the follower bending section is denoted by a solid line.

In the leader following control using the virtual length of the follower bending section in the absolute coordinate system illustrated in FIG. 9A, the bending angle ab of the most distal bending section remains unchanged when the base 140 moves forward beyond the displacement e of the base 140. This allows, for example, an insertion operation into a narrow space without changing the operator's bending angle command. However, if the control algorithm is directly applied to the relative coordinate system, the response is different from in the absolute coordinate system. This phenomenon is described below with reference to FIG. 9B.

FIG. 9B is a graph in which the abscissa axis is the displacement $z_b$ of the base 140, and the ordinate axis is the bending angle $\theta\sim$ in the relative coordinate system. In FIG. 9B, the dash line denotes the bending angle command (target bending angle) of the most distal bending section (Leader) from the operator, and the solid line denotes the interpolated bending angle command (target bending angle) of the follower bending section (Follower). When the bending angle command ab of the most distal bending section is given by the operator at the displacement a of the base 140 illustrated in FIG. 9B, the bending angle is automatically generated for the follower bending section so as to be ef at the displacement e of the base 140, for example. Then, at the displacement e of the base 140 illustrated in FIG. 9B, the bending angle command of the most distal bending section from the operator is completely propagated to the follower bending section, so that in the relative coordinate system, the operator gives 0 to the bending angle command of the most distal bending section to maintain the initial movement direction. Since the bending angle command is propagated to the follower bending section over the virtual length of the follower bending section, the bending angle command of the follower bending section is interpolated so as to be 0 at a displacement g of the base 140. Then, the continuum robot 100 is in a completely straight posture during the forward movement after the displacement g of the base 140.

Therefore, the present embodiment provides an algorithm of the leader following control that enables the operability when using a bending angle command based on a relative coordinate system to be similar to the operability in an absolute coordinate system. The follower bending section is divided into a plurality of bending sections that are virtual (hereafter referred to as "virtual bending sections"). Let $l_{nv}$ be the length of the virtual bending section that is used when dividing the n-th bending section, which is a follower bending section. Then, the number of divisions d is given as follows:

$$d = \lceil 1_n / 1_{nv} \rceil \qquad (11)$$

According to the present embodiment, the virtual bending sections obtained by virtually dividing the follower bending section are called the first ($1_{st}$ virtual follower), . . . , m-th, . . . , and d-th virtual bending sections, in order from the virtual bending section at the distal end. The angle calculation unit 210 propagates the bending angle of the most distal bending section in the same manner as in the leader following control in the absolute coordinate system. Furthermore, the angle calculation unit 210 superimposes all the bending angle commands of the plurality of divided virtual bending sections to generate a bending angle command (target bending angle) $\theta\!\sim_F$ for the follower bending section.

The process performed by the angle calculation unit 210 according to the present embodiment is illustrated in FIG. 9C.

Like FIG. 9B, FIG. 9C is a graph in which the abscissa axis represents the displacement $z_b$ of the base 140, and the ordinate axis represents the bending angle $\theta\!\sim$ in the relative coordinate system. In FIG. 9C, the dash line denotes the bending angle command (target bending angle) for the most distal bending section (Leader) from the operator, and the thin solid, dash-dot, and dash-double-dot lines denote the bending angle commands (the target bending angles) for a first virtual bending section ($1_{st}$ virtual follower), a second virtual bending section ($2_{nd}$ virtual follower), and a third virtual bending section ($3_{rd}$ virtual follower) in the follower bending section, respectively. Furthermore, in FIG. 9C, the thick solid line denotes the bending angle command (target bending angle) $\theta\!\sim_F$ for the follower bending section.

When, in FIG. 9C, the bending angle command ab for the most distal bending section is given by the operator at the displacement a of the base 140, the bending angle is automatically generated for the first virtual bending section in the follower bending section so as to be ef at the displacement e of the base 140 and be 0 at the displacement g of the base 140. Similarly, for the second virtual bending section in the follower bending section, the bending angle is automatically generated to be gh at the displacement g of the base 140 and be 0 at the displacement c of the base 140. For the third virtual bending section in the follower bending section, the bending angle is automatically generated to be cd at the displacement c of the base 140 and be 0 at a displacement i of the base 140.

Then, in FIG. 9C, the angle calculation unit 210 superimposes the bending angles of all the virtual bending sections (first to third virtual bending sections) in the follower bending section and, thus, the bending angle command ab is maintained as the bending angle command (target bending angle) $\theta\!\sim_F$ for the follower bending section for the displacement $z_b$ of the base 140 from the point e to the point c. This is the same as the bending angle command for the follower bending section illustrated in FIG. 9A. As can be seen, by using a virtual bending section, the leader following control based on the relative coordinate system can have an operability the same as the leader following control using the absolute coordinate system.

1.2) Calculation of Wire Driving Displacement Driving Amount

According to the present embodiment, the bending angle command (target bending angle) $\theta\!\sim_L$ based on the relative coordinate system is given to the most distal bending section, and the bending angle of the follower bending section is propagated in the relative coordinate system. Therefore, to obtain the driving displacement (driving amount) of the wire, the driving displacement (driving amount) of the wire can be obtained for each of the bending sections in the relative coordinate system by using Expression (3) first and, thereafter, the result can be transformed into the driving displacement (driving amount) of the wire in the absolute coordinate system by using Expression (4). Then, by providing the driving displacement (driving amount) of the wire in the absolute coordinate system as the target driving displacement (target driving amount) of the drive unit, the shape of the bendable unit 170 of the continuum robot 100 can be controlled.

Figure 10A:
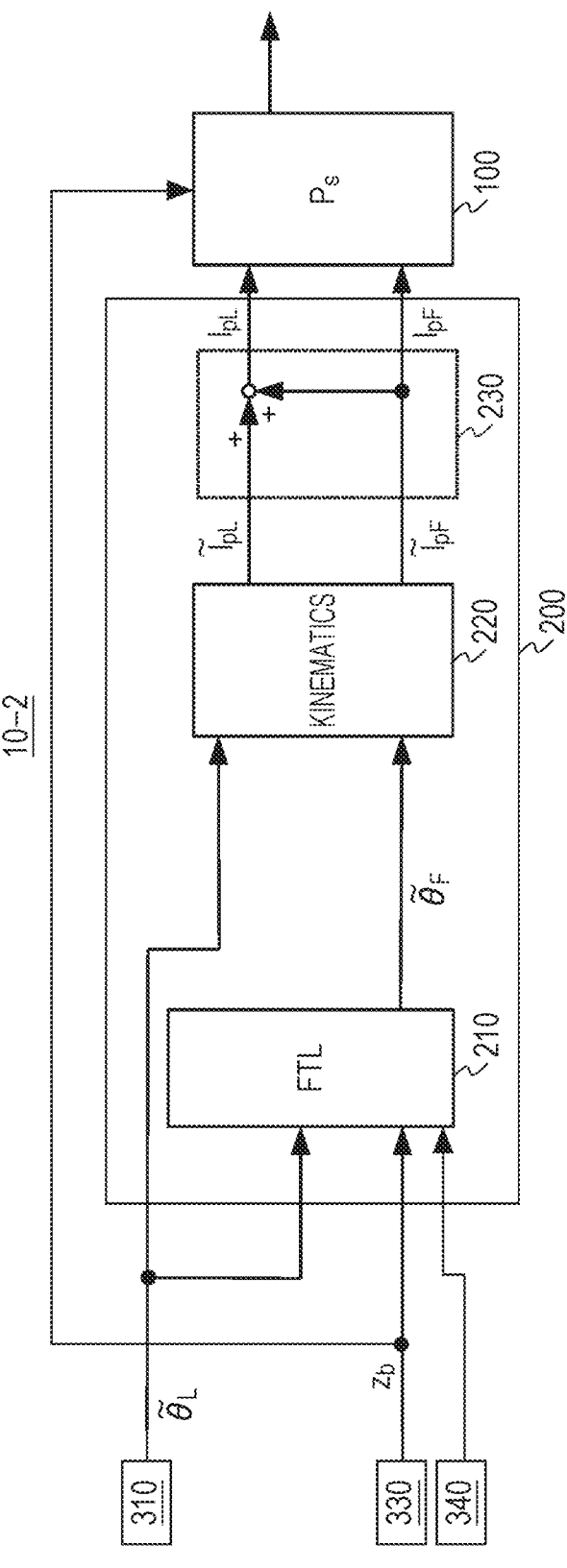
FIG. 10A illustrates an example configuration of a coordinate transformation unit in the continuum robot control system illustrated in FIG. 8 according to the second embodiment of the present disclosure.
Figure 10B:
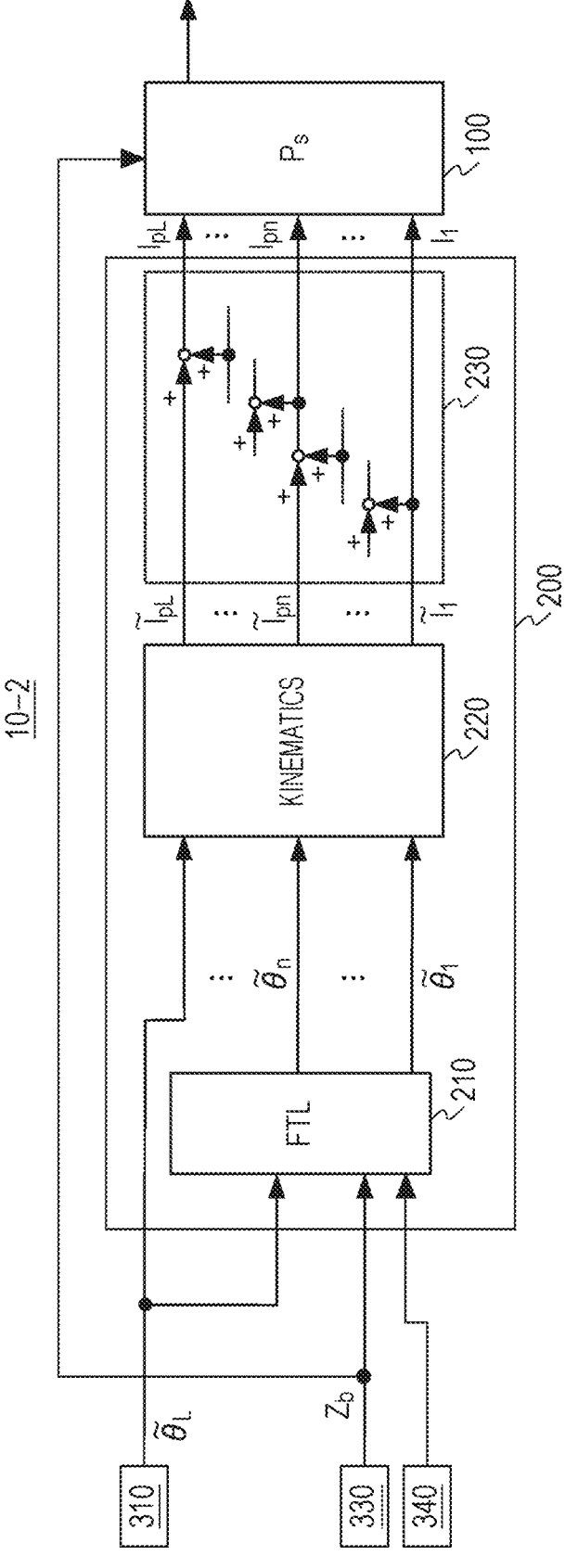
FIG. 10B illustrates an example configuration of the coordinate transformation unit in the continuum robot control system illustrated in FIG. 8 according to the second embodiment of the present disclosure.

FIGS. 10A and 10B illustrate an example configuration of the coordinate transformation unit 230 of the continuum robot control system 10-2 according to the second embodiment of the present disclosure illustrated in FIG. 8. In FIGS. 10A and 10B, configurations similar to those illustrated in FIG. 8 are identified by the same reference numerals, and the detailed description of the configurations is omitted. More specifically, FIG. 10A illustrates a first configuration example of the coordinate transformation unit 230 according to the second embodiment, and FIG. 10B illustrates a second configuration example of the coordinate transformation unit 230 according to the second embodiment.

In FIGS. 10A and 10B, FTL represents the angle calculation unit 210, which corresponds to an algorithm section of the leader following control in the relative coordinate system. The symbol $1\!\sim_{pL}$ illustrated in FIG. 10A and FIG. 10B represents the driving displacement (driving amount) of the wire in the most distal bending section in the relative coordinate system. The symbol $1\!\sim_{pF}$ illustrated in FIG. 10A and the symbols $1\!\sim pn$ to $1\!\sim_{pL}$ illustrated in FIG. 10B represent the driving displacements (driving amounts) of the wires in the follower bending sections in the relative coordinate system. The coordinate transformation unit 230 illustrated in FIGS. 10A and 10B transforms the driving displacement (driving amount) of the wire in the relative coordinate system to the driving displacement (driving amount) of the wire in the absolute coordinate system by using Expression (4).

FIG. 10A illustrates the algorithm in relation to two bending sections (the most distal bending section and the follower bending section). FIG. 10B illustrates a more general algorithm where the number of bending sections is L (L is, for example, a positive number greater than or equal to three). In FIG. 10B, the bending angle command (target bending angle) $\theta\!\sim_L$ of the most distal bending section in the relative coordinate system is propagated to the first bending section by the angle calculation unit 210, and the driving displacement (driving amount) of the wire of each of the bending sections in the relative coordinate system is calculated by the kinematics calculation unit 220. Then, in the coordinate transformation unit 230 surrounded by dash lines, the driving displacement (driving amount) of the wire of the n-th bending section in the absolute coordinate system, for example, is calculated using Expression (4).

2) Simulation

In this chapter, simulation is conducted using the leader following control system in the relative coordinate system described in the previous chapter. In the present simulation, the number of bending sections of the bendable unit 170 is three (that is, the bendable unit 170 consists of the first bending section 171 to the third bending section 173, as illustrated in FIG. 1). In addition, the simulation is conducted on a continuum robot 100 including the first bending section 171 with a length of 0.04 m, the second bending section 172 with a length of 0.01 m, and the third bending section 173 with a length of 0.01 m. The first bending section 171, which is a follower bending section, is divided into four virtual bending sections, each having a length of 0.01 m.

FIGS. 11A to 11G illustrate the second embodiment of the present disclosure and illustrate the simulation results in the control response of the leader following control illustrated in FIG. 9C. More specifically, FIGS. 11A to 11G illustrate the simulation results. In FIGS. 11A to 11G, configurations similar to those illustrated in FIG. 1 are identified by the same reference numerals.

In the simulations illustrated in FIGS. 11A to 11G, the bending operation for the third bending section 173, which is the most distal bending section, consists of moving the third bending section 173 straight forward by 0.01 m after the start of motion, bending the third bending section 173 at a bending angle of 45 degrees, and further moving the third bending section 173 forward by 0.05 m.

In FIGS. 11A to 11G, a square mark denotes the base 140, the solid line denotes the first bending section 171, the dotted line denotes the second bending section 172, and the dash-dot line denotes the third bending section 173. In addition, in FIGS. 11A to 11G, the dash line denotes a supposed path 1110.

Figure 11A:
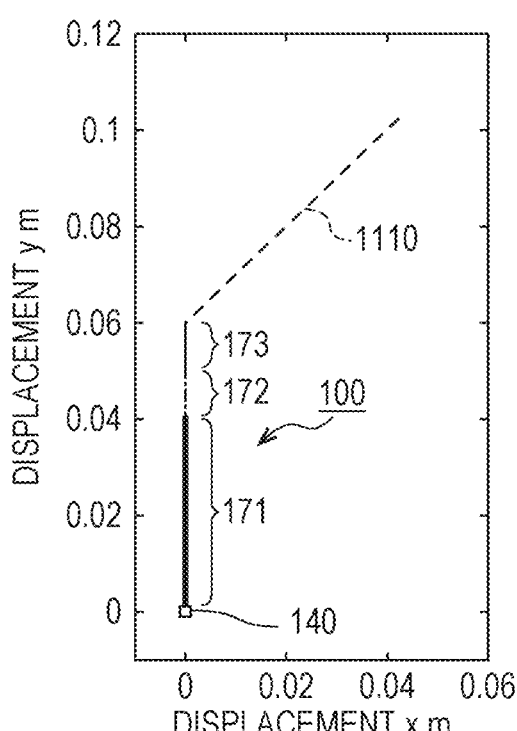
FIG. 11A illustrates the second embodiment of the present disclosure and illustrates the simulation results in the control response of the leader following control illustrated in FIG. 9C.
Figure 11B:
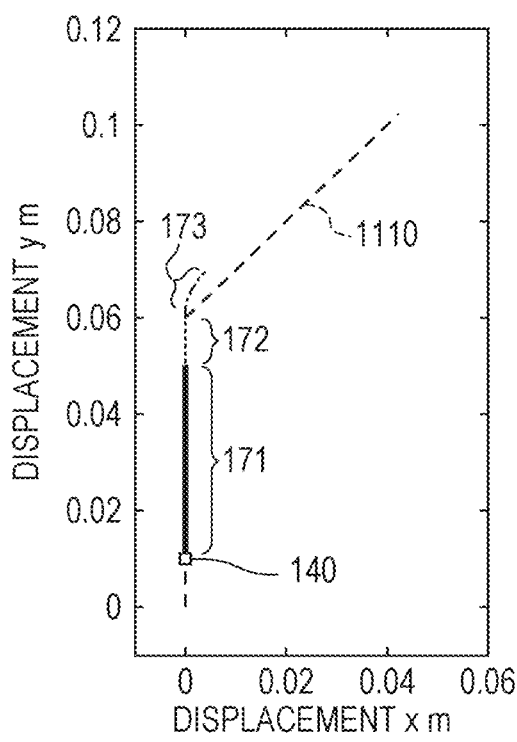
FIG. 11B illustrates the second embodiment of the present disclosure and illustrates the simulation results in the control response of the leader following control illustrated in FIG. 9C.
Figure 11C:
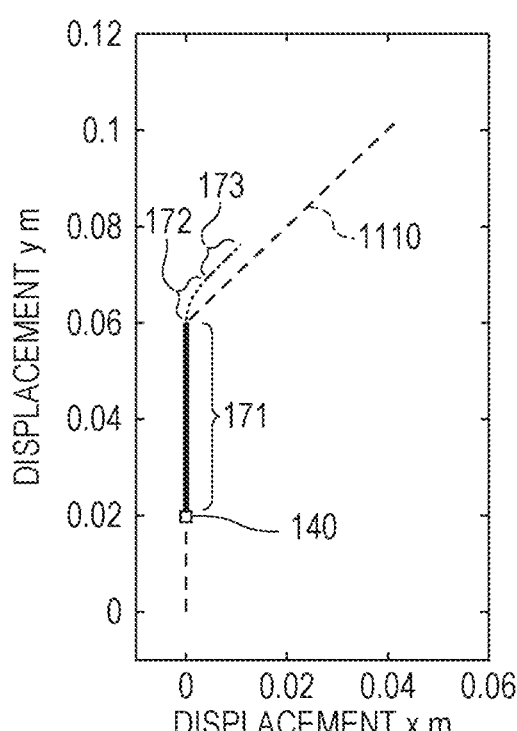
FIG. 11C illustrates the second embodiment of the present disclosure and illustrates the simulation results in the control response of the leader following control illustrated in FIG. 9C.

More specifically, in FIG. 11B, the operator submits, to the third bending section 173, which is the most distal bending section, a bending angle command to bend at 45 degrees. Subsequently, in FIG. 11C, the bending angle command from the operator is propagated to the second bending section 172, which is the first follower bending section, and the second bending section 172 bends at 45 degrees. The operator then operates the third bending section 173, which is the most distal bending section, to bend at 0 degrees based on the relative coordinate system and maintain the movement direction.

Figure 11D:
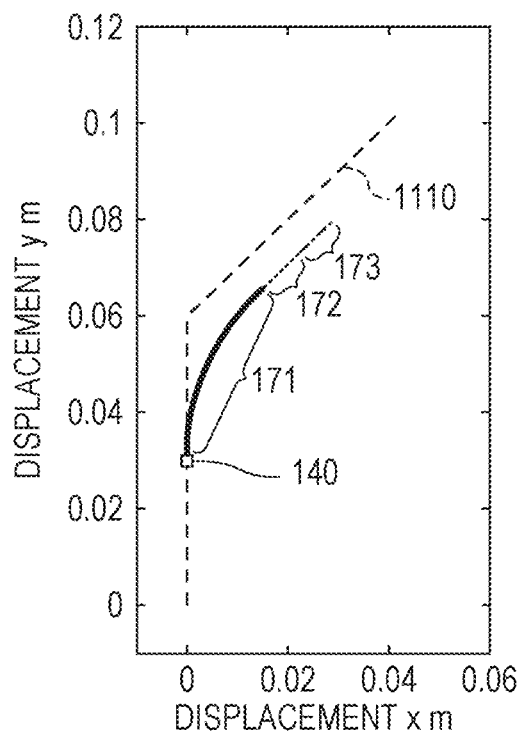
FIG. 11D illustrates the second embodiment of the present disclosure and illustrates the simulation results in the control response of the leader following control illustrated in FIG. 9C.

Subsequently, in FIG. 11D, the bending angle command from the operator is propagated to the first bending section 171, which is the second follower bending section, and the first bending section 171 bends at 45 degrees. At this time, a bending angle command of 0 degrees based on the relative coordinate system is propagated to the second bending section 172. Since the length of each of the virtual bending sections in the first bending section 171 is set to 0.01 m, "45 degrees" specified by the initial bending angle command from the operator is propagated to the first virtual bending section. The bending angles of the second to fourth virtual bending sections in the first bending section 171 are 0 degrees. According to the present embodiment, since all the bending angle commands of the virtual bending sections are superimposed to generate the bending angle command (target bending angle) for the first bending section 171 in the relative coordinate system, the first bending section 171 is bent at 45 degrees. This is the same response as when the virtual section length is set to 0.01 in PTL 1.

Figure 11E:
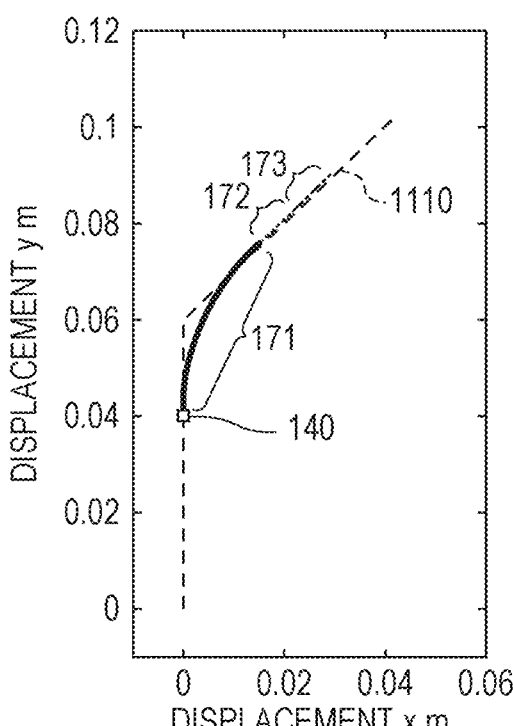
FIG. 11E illustrates the second embodiment of the present disclosure and illustrates the simulation results in the control response of the leader following control illustrated in FIG. 9C.
Figure 11F:
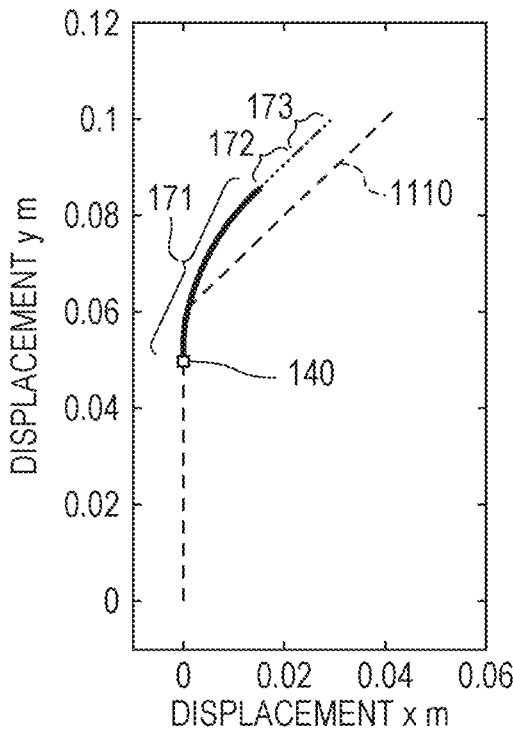
FIG. 11F illustrates the second embodiment of the present disclosure and illustrates the simulation results in the control response of the leader following control illustrated in FIG. 9C.
Figure 11G:
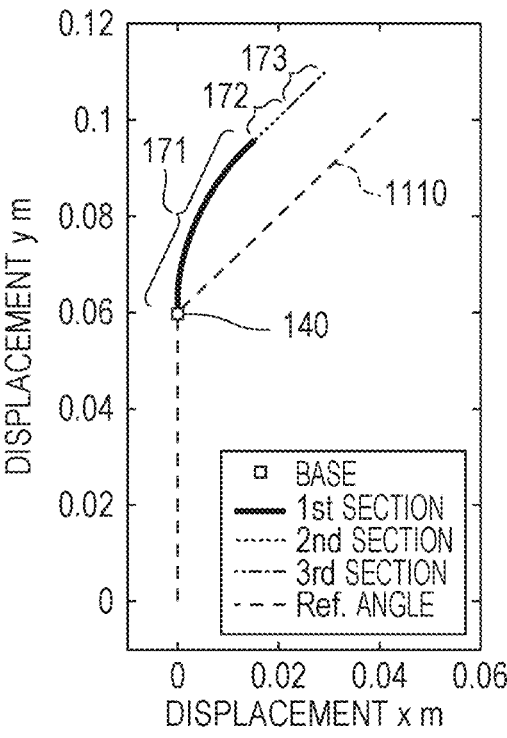
FIG. 11G illustrates the second embodiment of the present disclosure and illustrates the simulation results in the control response of the leader following control illustrated in FIG. 9C.

Subsequently, in FIGS. 11E to 11G, the bending angle command of 45 degrees, which is the initial bending angle command from the operator, is propagated to the second to fourth virtual bending sections in the first bending section 171, respectively, and the bending angles of the bending sections including the other virtual bending sections are 0 degrees. Therefore, in each of FIGS. 11E to 11G, the bending angle of the first bending section 171 is 45 degrees. As can be seen, the base 140 can be moved forward while maintaining the bending angle command for the third bending section 173 specified by the operator in FIG. 11B. This enables the operator to intuitively operate the bendable unit 170 using a relative coordinate system based on the second bending section 172 when, for example, the operator uses a camera mounted at the front end of the continuum robot (for example, at the front end (the most distal end) of the third bending section 173). Furthermore, according to the present embodiment, the maintenance of the bending angle command during forward movement, which was achieved by using the virtual section length in the absolute coordinate system, is achieved in the relative coordinate system. Therefore, for example, if the supposed path 1110 denoted by the dash lines in FIGS. 11A to 11G is a narrow space having a width, the continuum robot 100 can enter the narrow space along the shape of the narrow space.

FIGS. 12A to 12G illustrate the simulation results in the control response of the leader following control illustrated in FIG. 9B, as compared with FIGS. 11A to 11G. More specifically, FIGS. 12A to 12G illustrate, as a comparative example, the simulation results in the control response of the leader following control without using the virtual bending section illustrated in FIG. 9B. In FIGS. 12A to 12G, configurations similar to those illustrated in FIG. 1 and FIGS. 11A to 11G are identified by the same reference numerals.

FIGS. 12A to 12D illustrate the same responses as the responses in FIGS. 11A to 11D described above.

Figure 12A:
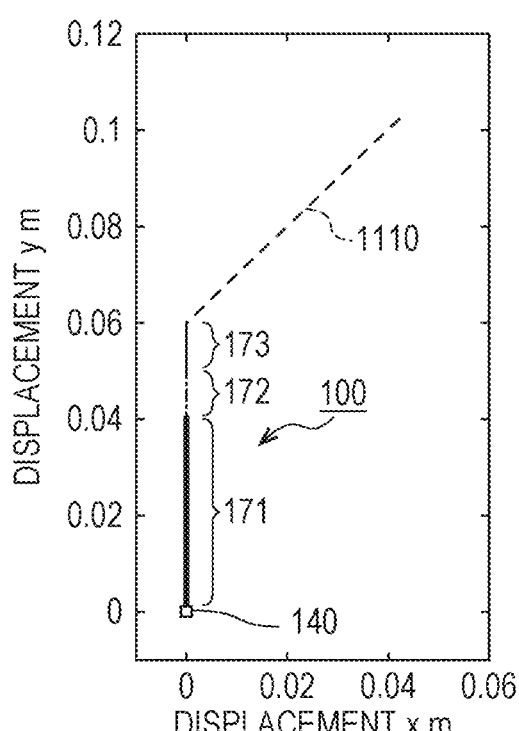
FIG. 12A illustrates the simulation results in the control response of the leader following control illustrated in FIG. 9B as a comparison with FIGS. 11A to 11G.
Figure 12B:
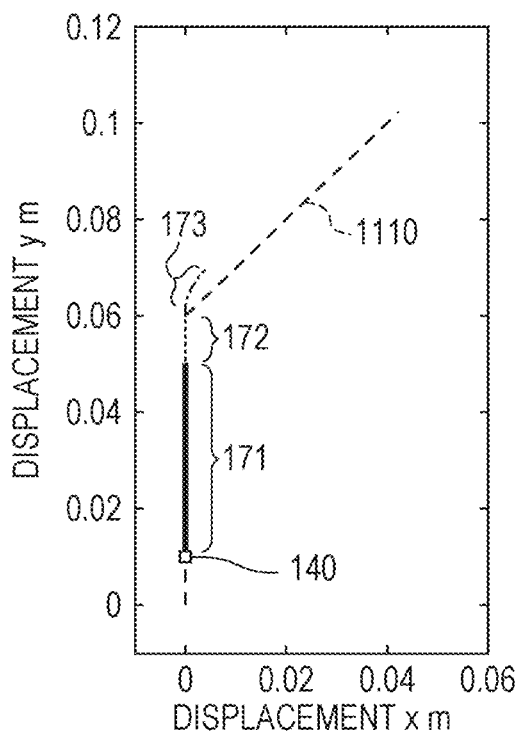
FIG. 12B illustrates the simulation results in the control response of the leader following control illustrated in FIG. 9B as a comparison with FIGS. 11A to 11G.
Figure 12C:
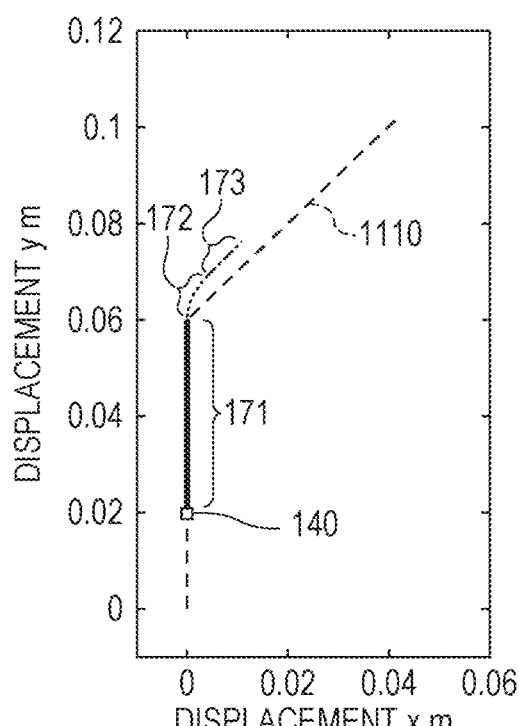
FIG. 12C illustrates the simulation results in the control response of the leader following control illustrated in FIG. 9B as a comparison with FIGS. 11A to 11G.
Figure 12D:
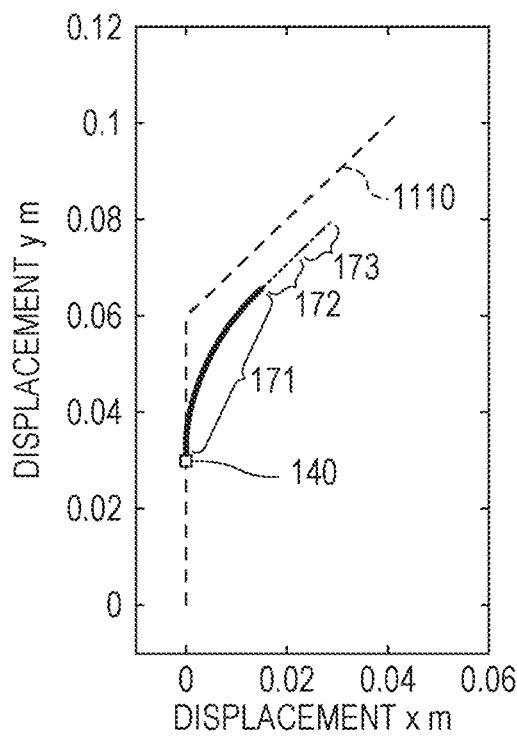
FIG. 12D illustrates the simulation results in the control response of the leader following control illustrated in FIG. 9B as a comparison with FIGS. 11A to 11G.
Figure 12E:
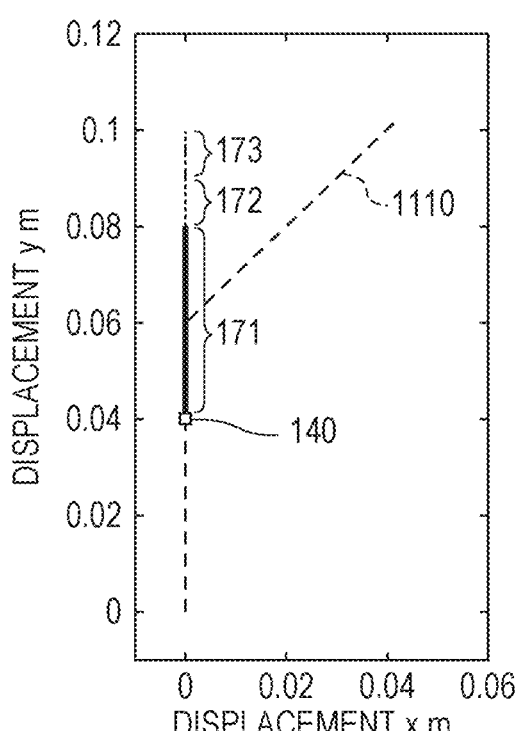
FIG. 12E illustrates the simulation results in the control response of the leader following control illustrated in FIG. 9B as a comparison with FIGS. 11A to 11G.
Figure 12F:
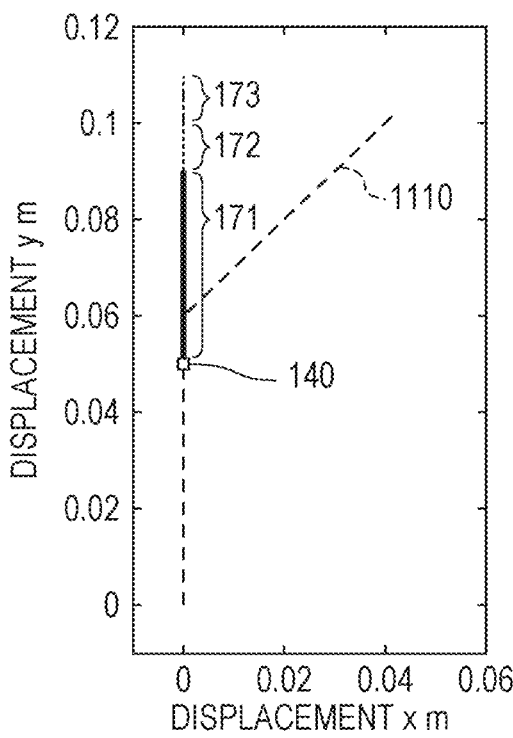
FIG. 12F illustrates the simulation results in the control response of the leader following control illustrated in FIG. 9B as a comparison with FIGS. 11A to 11G.
Figure 12G:
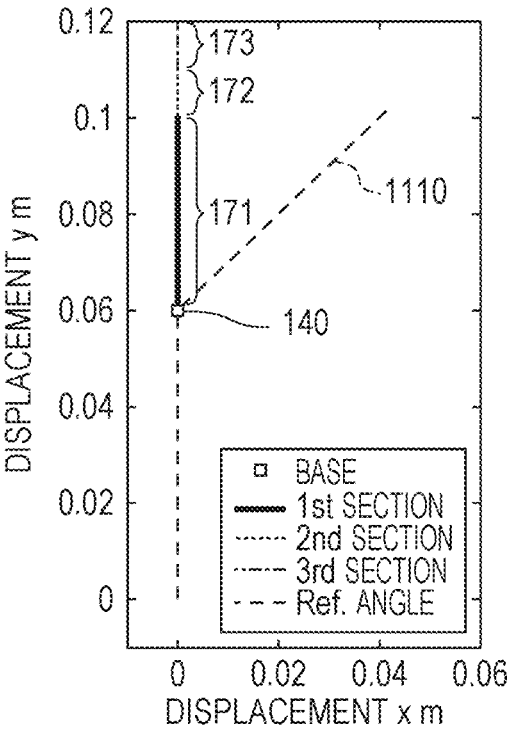
FIG. 12G illustrates the simulation results in the control response of the leader following control illustrated in FIG. 9B as a comparison with FIGS. 11A to 11G.

However, in FIGS. 12E to 12G, a bending angle command of 0 degrees propagates to the first bending section 171. This is because the bending angle command given to the third bending section 173, which is the most distal bending section, propagates in FIG. 12C. Therefore, as can be seen, the bending angle of the first bending section 171 returns to 0 degrees and, thus, the base 140 cannot be moved forward while maintaining the bending angle command of the third bending section 173 specified by the operator in FIG. 12B. For example, if the supposed path 1110 denoted by the dash lines in FIGS. 12A to 12G is a narrow space having a width, the front end of the bendable unit 170 of the continuum robot 100 enters the narrow space while contacting the wall of the narrow space at an angle of 45 degrees, which may damage the continuum robot 100.

The control unit 200 of the continuum robot control system 10-2 according to the second embodiment includes the angle calculation unit 210 that performs the processes described below.

When calculating the target bending angle $\theta \sim_F$ of the follower bending section in the relative coordinate system, the angle calculation unit 210 divides the follower bending section into a plurality of sections (virtual bending sections) and performs a process to superimpose the target bending angles of the plurality of virtual bending sections in the relative coordinate system when the follower bending section bends following the bending motion of the distal bending section (refer to, for example, FIG. 9C).

When the bendable unit 170 of the continuum robot 100 enters a narrow space, such a configuration enables the bendable unit 170 to enter the narrow space along the narrow space.

Third Embodiment

The third embodiment of the present disclosure is described below. In the description of the third embodiment described below, description of matters in common with the first and second embodiments described above is omitted, and matters that differ from those described above in the first and second embodiments are described.

According to the first and second embodiments described above, the control of the motion of the continuum robot 100 in the x-z plane is described. According to the third embodiment, control of the motion of the continuum robot 100 based on a relative coordinate system in three-dimensional space is described.

To obtain a driving displacement by an actuator for controlling the bending angle and the turning angle of the continuum robot 100, the kinematics is derived.

The definitions of symbols used in the present embodiment are as follows:

$l_{nd}$: Length of the central axis of the n-th bending section, $\theta_n$: Target bending angle (of the distal end) of the n-th bending section, $\zeta_n$: Target turning angle (of the distal end) of the n-th bending section, $\theta\sim_n$: Target bending angle (of the distal end) of the n-th bending section in the relative coordinate system, $\zeta\sim_n$: Target turning angle (of the distal end) of the n-th bending section in the relative coordinate system, and $\rho n$: Radius of curvature of the n-th bending section.

In addition, according to the present embodiment, the symbols for the driving displacement (driving amount) of the wires are defined as follows:

$l\sim_{pnam}$, $l\sim_{pnbm}$, $l\sim_{pncm}$: Driving displacements (driving amounts) of the a-wire, b-wire, and c-wire connected to the distal end of the n-th bending section in the m-th bending section in a relative coordinate system xm-ym-zm.

Herein, n≥m.

According to the present embodiment, the following assumptions are then made to derive the kinematics of the continuum robot 100:

1. In each of the bending sections, the wire is deformed with constant curvature.

2. Torsional deformation of the wire is not taken into account.

3. The wire is not deformed in the longitudinal direction.

4. Friction between the wire guide and the wire is not taken into account.

According to the present embodiment, the rotation matrices around the reference axis z and the reference axis y are expressed as $R_z(\theta)$ and $R_y(\theta)$, respectively, which are shown in the following equation (12):

$$R_z(\theta) = \begin{bmatrix} \cos\theta & -\sin\theta & 0 \\ \sin\theta & \cos\theta & 0 \\ 0 & 0 & 1 \end{bmatrix}, R_y(\theta) = \begin{bmatrix} \cos\theta & 0 & \sin\theta \\ 0 & 1 & 0 \\ -\sin\theta & 0 & \cos\theta \end{bmatrix} \quad (12)$$

The first bending section 171 is discussed first.

In the first bending section 171, the relationship between the driving displacements (driving amounts) $l\sim_{p1a1}$, $l\sim_{p1b1}$, and $l\sim_{p1c1}$ of the a- to c-wires, respectively, and the bending angle $\theta\sim_1$ and turning angle $\zeta\sim_1$ of the distal ends thereof is given as follows:

$$\begin{aligned} \tilde{l}_{p1a1} &= -\frac{r_s}{\sqrt{3}}\cos\zeta_1\tilde{\theta}_1 \\ \tilde{l}_{p1b1} &= -\frac{r_s}{\sqrt{3}}\cos\left(\frac{2\pi}{3} - \zeta_1\right)\tilde{\theta}_1 \\ \tilde{l}_{p1c1} &= -\frac{r_s}{\sqrt{3}}\cos\left(\frac{4\pi}{3} - \zeta_1\right)\tilde{\theta}_1 \end{aligned} \right\} \quad (13)$$

Subsequently, the relationship between the driving displacements (driving amounts) $l_{pna}$, $l_{pnb}$, and $l_{pnc}$ of the a- to c-wires, respectively, in the n-th bending section of the continuum robot 100 having a plurality of bending sections and the bending angle $\theta\sim_n$ and turning angle $\zeta\sim_n$ at the distal end is obtained. First, let e denote the number of bending sections, and let $\xi_n$ denote the phase angle of the wire that drives the n-th bending section. Then, the phase angle $\xi_n$ is given as follows:

$$\xi_n = \frac{120}{e}(n-1) \quad (14)$$

Accordingly, the driving displacements (driving amounts) $l\sim_{pnam}$, $l\sim_{pnbm}$, and $l\sim_{pncm}$ of the a- to c-wires in the relative coordinate system xm-ym-zm shown in the following equation (15):

$$\begin{aligned} \tilde{l}_{pnam} &= -\frac{r_s}{\sqrt{3}}\cos\left(\tilde{\zeta}_m - \xi_n\right)\tilde{\theta}_m \\ \tilde{l}_{pnbm} &= -\frac{r_s}{\sqrt{3}}\cos\left(\frac{2\pi}{3} - \tilde{\zeta}_m + \xi_n\right)\tilde{\theta}_m \\ \tilde{l}_{pncm} &= -\frac{r_s}{\sqrt{3}}\cos\left(\frac{4\pi}{3} - \tilde{\zeta}_m - \xi_n\right)\tilde{\theta}_m \end{aligned} \right\} \quad (15)$$

As a result, each of the driving displacements (driving amounts) $l_{pna}$, $l_{pnb}$, and $l_{pnc}$ of the a- to c-wires in the n-th bending section is the sum of the driving displacements (driving amounts) of the a- to c-wires in the first to n-th bending section in the relative coordinate system and is given as follows:

$$l_{pna} = \sum_{m=1}^{n}\tilde{l}_{pnam}, l_{pnb} = \sum_{m=1}^{n}\tilde{l}_{pnbm}, l_{pnc} = \sum_{m=1}^{n}\tilde{l}_{pncm} \quad (16)$$

The driving displacements (driving amounts) of the a- to c-wires can be obtained by obtaining the driving displacements (driving amounts) of the wires in each of the bending sections in the relative coordinate system by using Expression (15) and, then, transforming the driving displacements (driving amounts) of the wires into those in the absolute coordinate system by using Expression (16).

Subsequently, the relationship among the coordinate transformation matrix obtained through the transformation, the bending angle and turning angle of the n-th bending section (at the distal end), and the coordinates of the distal end of the n-th bending section is derived.

The coordinates $(x\sim_{tn}, y\sim_{tn}, z\sim_{tn})$ of the distal end of the n-th bending section in the relative coordinate system xm-ym-zm are given by the following Expressions (17), (18), and (19), respectively:

$$\tilde{x}_m = \frac{l_{nd}}{\theta_n}(1 - \cos\theta_n)\cos(\zeta_n + \xi_n) \tag{17}$$

$$\tilde{y}_m = \frac{l_{nd}}{\theta_n}(1 - \cos\theta_n)\sin(\zeta_n + \xi_n) \tag{18}$$

$$\tilde{z}_m = \frac{l_{nd}}{\theta_n}\sin\theta_n \tag{19}$$

Therefore, by using a rotation transformation matrix, the coordinates $(x_{tm}, y_{tm}, z_{tm})$ of the distal end of the n-th bending section in the absolute coordinate system are given s follows:

FIG. 13 illustrates an example of the schematic configuration of a continuum robot control system 10-3 according to the third embodiment of the present disclosure. In FIG. 13, configurations similar to those illustrated in FIG. 8 and FIGS. 10A and 10B are identified by the same reference numerals, and the detailed description of the configurations is omitted.

As illustrated in FIG. 13, the continuum robot control system 10-3 includes a continuum robot 100, a control unit 200, and various input devices 310 and 330 to 350.

The input device 350 is a device that inputs, to the control unit 200, phase angles $\xi_1$ to $\xi_L$ of the wires that drive first to L-th bending sections, respectively.

According to the present embodiment, the input device 310 is a device that inputs, to the control unit 200, the target bending angle $\theta\text{~}_L$ and target turning angle $\zeta\text{~}_L$ of the most distal bending section in the relative coordinate system.

The target turning angle $\zeta\text{~}_F$ of the follower bending section in the relative coordinate system is obtained by replacing the in-plane bending angle in the leader following control according to the first embodiment with the turning angle. At this time, a virtual bending section can be used to provide the same operability as in the leader following control that uses the absolute coordinate system.

In addition, the angle of each of the bending sections can be controlled by obtaining the driving displacement (driving amount) of the wire for each of the bending sections in the relative coordinate system by using Expression (15) and transforming the driving displacement (driving amount) of the wire to that in the absolute coordinate system by using Expression (16).

As illustrated in FIG. 13, the kinematics calculation unit 220 according to the third embodiment includes a plurality of "Loc.Kine." blocks 221. The "Loc.Kine." block 221 receives the target bending angle $\theta\text{~}_n$ and the target turning angle $\zeta\text{~}_n$ of the n-th bending section in the relative coordinate system and the phase angle $\xi_n$ of the wire that drives the n-th bending section and outputs the driving displacements (driving amounts) $l\text{~}_{pnam}$, $l\text{~}_{pnbm}$, and $l\text{~}_{pncm}$ of the wire in the relative coordinate system. In FIG. 13, $l\text{~}_{pnam}$, $l\text{~}_{pnbm}$ and $l\text{~}_{pncm}$ are collectively denoted as $l\text{~}_{pnxm}$ by using vector notation.

The coordinate transformation unit 230 according to the third embodiment calculates the sum of the driving displacements (driving amounts) of the wires in the relative displacement system, as denoted by Expression (16). Thus, the driving displacements (driving amounts) $l_{pna}$, $l_{pnb}$, and $l_{pnc}$ of the wires in the n-th bending section can be obtained. In FIG. 13, $l_{pna}$, $l_{pnb}$, and $l_{pnc}$ are collectively denoted as $l_{pnx}$ by using vector notation.

Like the first embodiment, according to the third embodiment, even when, for example, a camera is provided at the most distal end of the continuum robot 100, and then, the operator who cannot look down on the continuum robot 100 operates the bendable unit 170 of the continuum robot 100 while observing the camera image, the operator can intuitively operate the bendable unit 170 of the continuum robot 100.

Other Embodiments

One or more features of the present disclosure can also be achieved by supplying a program that provides one or more functions of the above embodiments to a system or an apparatus via a network or a storage medium and causing one or more processors of the system or apparatus to execute the program. Alternatively, one or more features of the present disclosure can also be achieved by a circuit that realizes the one or more functions (for example, ASIC).

The program and a computer-readable storage medium storing the program are included in the present disclosure.

The above-described embodiments of the present disclosure are merely examples of embodiments for implementing one or more features of the present disclosure, and the technical scope of the present disclosure should not be interpreted as limited by the embodiments. That is, one or more features of the present disclosure can be implemented in various forms without departing from its technical concept or its main features.

According to the present disclosure, when operating a bendable unit of a continuum robot, the operator can intuitively operate the bendable unit.

While one or more features of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A continuum robot control system comprising:
   a continuum robot including a bendable body having a plurality of bending sections each configured to be bent by a linear member that is driven, a base configured to support the bendable body, and a drive driver configured to drive the linear member, wherein the plurality of bending sections of the bendable body include a distal bending section that is located distal from the base and that includes a distal fixed member located most distal from the base in the distal bending section and a distal linear member serving as the linear member fixed to the distal fixed member and driven by the driver and at least one follower bending section that is located between the distal bending section and the base and that includes a follower fixed member located most distal from the base in the at least one follower bending section and a follower linear member serving as the linear member fixed to the follower fixed member and driven by the driver; and
   a controller configured to control a motion of the continuum robot,
   wherein the controller defines a predetermined position on the follower fixed member as an origin, sets reference axes for a direction in which the follower fixed member is facing where one reference axis of the reference axes extends orthogonally from the predetermined position on the follower fixed member, and causes the driver to drive the distal linear member so that the distal bending section is bent based on a relative coordinate system in which the origin and the reference axes relating to the follower fixed member vary in accordance with the movement of the continuum robot, and wherein the controller operates to: (i) determine a bend angle between a reference axis extending orthogonally from a predetermined position on the distal fixed member of the distal bending section and a reference axis extending from the predetermined position on the distal fixed member of the distal bending section and corresponding to or being parallel to the one orthogonal reference axis of the follower fixed member; and (ii) use the determined bend angle to drive the distal linear member and bend the distal bending section.

2. The continuum robot control system according to claim 1, wherein the at least one follower bending section includes a first follower bending section and a second follower bending section, wherein the first follower bending section is located between the distal bending section and the second follower bending section and includes a first follower fixed member that is located most distal from the base in the first follower bending section and a first follower linear member serving as the linear member that is fixed to the first follower fixed member and that is driven by the driver, wherein the second follower bending section is located between the first follower bending section and the base and includes a second follower fixed member that is located most distal from the base in the second follower bending section and a second follower linear member serving as the linear member that is fixed to the second follower fixed member and that is driven by the driver, wherein the controller defines the predetermined position on the first follower fixed member as the origin, sets the reference axes for a direction in which the first follower fixed member is facing where one reference axis of the reference axes extends orthogonally from the predetermined position on the first follower fixed member, and causes the driver to drive the distal linear member so that the distal bending section is bent based on a first relative coordinate system serving as the relative coordinate system in which the origin and the reference axes relating to the first follower fixed member vary in accordance with the movement of the continuum robot, the bend angle being used to drive the distal linear member and to bend the distal bending section being determined to be between the reference axis extending orthogonally from the predetermined position on the distal fixed member of the distal bending section and a reference axis extending from the predetermined position on the distal fixed member of the distal bending section and corresponding to or being parallel to the one orthogonal reference axis of the first follower fixed member, wherein the controller defines the predetermined position on the second follower fixed member as an origin, sets reference axes for a direction in which the second follower fixed member is facing where one reference axis of the reference axes extends orthogonally from the predetermined position on the second follower fixed member, and causes the driver to drive the first follower linear member so that the first follower bending section is bent following a bending motion of the distal bending section based on a second relative coordinate system serving as the relative coordinate system in which the origin and the reference axes relating to the second follower fixed member vary in accordance with the movement of the continuum robot, and wherein the controller further operates to (i) determine a bend angle between a reference axis extending orthogonally from the predetermined position on the first follower fixed member of the first follower bending section and a reference axis extending from the predetermined position on the first follower fixed member of the first follower bending section and corresponding to or being parallel to the one orthogonal reference axis of the second follower fixed member; and (ii) use the determined bend angle to drive the first follower linear member and bend the first follower bending section.

3. The continuum robot control system according to claim 2, wherein the controller includes one or more processors that operate to: (i) calculate a driving amount of the distal linear member and a driving amount of the follower linear member in the relative coordinate system based on an input target bending angle of the distal bending section and an input target bending angle of the at least one follower bending section in the relative coordinate system, and (ii) transform the driving amount of the distal linear member and the driving amount of the follower linear member in the relative coordinate system into, and to obtain, a driving amount of the distal linear member and a driving amount of the follower linear member in an absolute coordinate system, and wherein the controller controls the driver based on the driving amount of the distal linear member and the driving amount of the follower linear member in the absolute coordinate system so that the bend angle of the distal bending section becomes or matches the input target bending angle of the distal bending section and so that the bend angle of the first follower bending section becomes or matches the input target bending angle of the first follower bending section.

4. The continuum robot control system according to claim 2, wherein the controller further operates to: (i) define a predetermined position on the base as an origin, set reference axes for a direction in which the base is facing where one reference axis of the reference axes extends orthogonally from the predetermined position on the base, and cause the driver to drive the second follower linear member so that the second follower bending section is bent following a bending motion of the distal bending section and/or the first follower bending section based on a third relative coordinate system serving as the relative coordinate system in which the origin and the reference axes relating to the base vary in accordance with the movement of the continuum robot, and the controller further operates to (i) determine a bend angle between a reference axis extending orthogonally from the predetermined position on the second follower fixed member of the second follower bending section and a reference axis extending from the predetermined position on the second follower fixed member of the second follower bending section and corresponding to or being parallel to the one orthogonal reference axis of the base; and (ii) use the determined bend angle to drive the second follower linear member and bend the second follower bending section.

5. The continuum robot control system according to claim 4, wherein the absolute coordinate system is equivalent to the third relative coordinate system.

6. The continuum robot control system according to claim 2, wherein the controller includes one or more processors that operate to:

(i) determine and use a respective turning angle for the distal bending section, the first follower bending section, and/or the second follower bending section to cause the driver to drive and turn one or more of the distal bending section, the first follower bending section, and/or the second follower bending section;

(ii) determine and use a respective radius of curvature for the distal bending section, the first follower bending section, and/or the second follower bending section to cause the driver to drive and cause to curve one or more of the distal bending section, the first follower bending section, and/or the second follower bending section; and/or (iii) determine and use a respective phase angle for the distal bending section, the first follower bending section, and/or the second follower bending section to cause the driver to drive the respective distal linear member, the first follower linear member, and/or the second follower linear member.

7. The continuum robot control system according to claim 1, wherein the controller includes one or more processors that operate configured to: (i) calculate a driving amount of the distal linear member and a driving amount of the follower linear member in the relative coordinate system based on an input target bending angle of the distal bending section and an input target bending angle of the at least one follower bending section in the relative coordinate system, and (ii) transform the driving amount of the distal linear member and the driving amount of the follower linear member in the relative coordinate system into, and to obtain, a driving amount of the distal linear member and a driving amount of the follower linear member in an absolute coordinate system, and wherein the controller controls the driver based on the driving amount of the distal linear member and the driving amount of the follower linear member in the absolute coordinate system so that the bend angle of the distal bending section becomes or matches the input target bending angle of the distal bending section.

8. The continuum robot control system according to claim 7, wherein the one or more processors further operate to calculate a target bending angle of the at least one follower bending section in the relative coordinate system based on the input target bending angle of the distal bending section in the relative coordinate system, a displacement of the base, and a length of the at least one follower bending section, and wherein the one or more processors perform-performs the calculation using the calculated target bending angle of the at least one follower bending section in the relative coordinate system.

9. The continuum robot control system according to claim 8, wherein when calculating the target bending angle of the at least one follower bending section in the relative coordinate system, the one or more processors further operate to divide the at least one follower bending section into a plurality of sections and perform a process to superimpose the target bending angles of the plurality of sections in the relative coordinate system when the at least one follower bending section bends following the bending motion of the distal bending section.

10. The continuum robot control system according to claim 9, wherein when calculating the target bending angle of the at least one follower bending section in the relative coordinate system, the one or more processors further operate to divide the at least one follower bending section into a plurality of virtual bending sections and perform the process to superimpose the target bending angles of the plurality of virtual bending sections in the relative coordinate system when the at least one follower bending section bends following the bending motion of the distal bending section.

11. The continuum robot control system according to claim 7, wherein when obtaining the driving amount of the distal linear member in the absolute coordinate system, the one or more processors add the driving amount of the follower linear member to the driving amount of the distal linear member in the relative coordinate system.

12. The continuum robot control system according to claim 1, wherein:

(i) the controller operates to receive a target bending angle of the distal bending section from an input device;

(ii) the controller operates to receive a target bending angle of the at least one follower bending section from an input device;

(iii the controller operates to receive a displacement of the base from an input device;

(iv) the controller operates to receive additional information from an input device, the additional information including one or more of the following: a length of the distal bending section and/or a length of the at least one follower section; and/or (v) the controller operates to drive the continuum robot using one or more of the following: the target bending angle of the distal bending section, the target bending angle of the at least one follower bending section, the displacement of the base, and/or the additional information.

13. The continuum robot control system according to claim 1, wherein a relationship between a driving displacement $l_{p1}$ of a linear member and a bending angle $\theta_1$ is given by the following equation:

$$l_{p1}=3/2r_1\theta_1 \tag{1}.$$

14. The continuum robot control system according to claim 1, wherein a relationship between a driving displacement or amount $l_{pn}$ of a linear member in an n-th bending section is a sum of the driving displacements or amounts of a linear member for driving the n-th bending section in the relative coordinate system in a first bending section to the (n−1)th bending section, and is expressed by the following equations (4) and (5):

$$l_{pn}=\tilde{l}_{pn}+\tilde{l}_{pn-1}+ \ldots +\tilde{l}_{p1} \tag{4}$$

$$=3/2r_n(\theta_n+\theta_{n-1}+ \ldots +\theta_1)=3/2r_n\theta_n \tag{5}.$$

15. The continuum robot control system according to claim 1, wherein a relationship between a bending angle $\theta_1$ of a first bending section at a distal end and coordinates $(x_{t1}, z_{t1})$ of the distal end is expressed by the following equations (6) and (7):

$$x_{t1}=l_1/\theta_1(1-\cos\theta_1) \tag{6}$$

$$z_{t1}=l_1/\theta_1 \sin\theta_1 \tag{7}.$$

16. The continuum robot control system according to claim 15, wherein, when using a rotation transformation matrix, the coordinates $(x_{t1}, z_{t1})$ of the distal end are expressed using the following equation (10):

$$\begin{bmatrix} x_{tn} \\ z_{tn} \end{bmatrix} = \begin{bmatrix} x_{t1} \\ z_b + z_{t1} \end{bmatrix} + \sum_{m=2}^{n} \begin{bmatrix} \cos\theta_{m-1} & \sin\theta_{m-1} \\ -\sin\theta_{m-1} & \cos\theta_{m-1} \end{bmatrix} \begin{bmatrix} \frac{l_m}{\theta_m}(1-\cos\theta_m) \\ \frac{l_m}{\theta_m}\sin\theta_m \end{bmatrix}. \tag{10}$$

17. The continuum robot control system according to claim 1, wherein the controller further includes a storage or memory that operates to store one or more reference tables each indicating a relationship between a pair of a target bending angle of the distal bending section and a target bending angle of the at least one follower bending section; and the controller includes one or more processors that operate to: (i) rewrite one or more of the reference tables and (ii) input to the one or more reference tables information regarding a length of the distal bending section or of the at least one follower bending section and information specifying the reference table of the one or more reference tables to be used to rewrite the selected reference table in accordance with a change in the target bending angle of the distal bending section and the displacement of the base.

18. A continuum robot control method for use of a continuum robot control system, the system including a continuum robot including a bendable body having a plurality of bending sections each configured to be bent by a linear member that is driven, a base configured to support the bendable body, and a driver configured to drive the linear member, wherein the plurality of bending sections of the bendable body include a distal bending section that is located distal from the base and that includes a distal fixed member located most distal from the base in the distal bending section and a distal linear member serving as the linear member fixed to the distal fixed member and driven by the driver and at least one follower bending section that is located between the distal bending section and the base and that includes a follower fixed member located most distal from the base in the at least one follower bending section and a follower linear member serving as the linear member fixed to the follower fixed member and driven by the driver, and a controller configured to control a motion of the continuum robot, the continuum robot control method comprising:

defining, by the controller, a predetermined position on the follower fixed member as an origin;

setting, by the controller, reference axes for a direction in which the follower fixed member is facing where one reference axis of the reference axes extends orthogonally from the predetermined position on the follower fixed member;

determining, by the controller, a bend angle between a reference axis extending orthogonally from a predetermined position on the distal fixed member of the distal bending section and a reference axis extending from the predetermined position on the distal fixed member of the distal bending section and corresponding to or being parallel to the one orthogonal reference axis of the follower fixed member; and causing, by the controller, the driver to drive the distal linear member so that the distal bending section is bent based on a relative coordinate system in which the origin and the reference axes relating to the follower fixed member vary in accordance with the movement of the continuum robot and using the determined bend angle to drive the distal linear member and bend the distal bending section.

19. A non-transitory computer-readable storage medium storing one or more control programs that operate to cause a computer to perform a continuum robot control method for use of a continuum robot control system, the system including a continuum robot including a bendable body having a plurality of bending sections each configured to be bent by a linear member that is driven, a base configured to support the bendable body, and a driver configured to drive the linear member, wherein the plurality of bending sections of the bendable body include a distal bending section that is located distal from the base and that includes a distal fixed member located most distal from the base in the distal bending section and a distal linear member serving as the linear member fixed to the distal fixed member and driven by the driver and at least one follower bending section that is located between the distal bending section and the base and that includes a follower fixed member located most distal from the base in the at least one follower bending section and a follower linear member serving as the linear member fixed to the follower fixed member and driven by the driver, and a controller configured to control a motion of the continuum robot, the continuum robot control method comprising:

defining, by the controller, a predetermined position on the follower fixed member as an origin;

setting, by the controller, reference axes for a direction in which the follower fixed member is facing where one reference axis of the reference axes extends orthogonally from the predetermined position on the follower fixed member;

determining, by the controller, a bend angle between a reference axis extending orthogonally from a predetermined position on the distal fixed member of the distal bending section and a reference axis extending from the predetermined position on the distal fixed member of the distal bending section and corresponding to or being parallel to the one orthogonal reference axis of the follower fixed member; and causing, by the controller, the driver to drive the distal linear member so that the distal bending section is bent based on a relative coordinate system in which the origin and the reference axes relating to the follower fixed member vary in accordance with the movement of the continuum robot and using the determined bend angle to drive the distal linear member and bend the distal bending section.

* * * * *